US010090873B2

(12) United States Patent
Huang et al.

(10) Patent No.: US 10,090,873 B2
(45) **Date of Patent: *Oct. 2, 2018**

(54) SIGNAL PROCESSING APPARATUS, METHOD, AND SYSTEM

(71) Applicant: HUAWEI TECHNOLOGIES CO., LTD., Shenzhen, Guangdong (CN)

(72) Inventors: Guolong Huang, Chengdu (CN); Hua Cai, Chengdu (CN); Yi Wang, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 15/891,932

(22) Filed: Feb. 8, 2018

(65) Prior Publication Data

US 2018/0167096 A1 Jun. 14, 2018

Related U.S. Application Data

(63) Continuation of application No. 15/292,444, filed on Oct. 13, 2016, now Pat. No. 9,917,606, which is a (Continued)

(51) Int. Cl.
*H04B 1/38* (2015.01)
*H04B 1/16* (2006.01)
*H04B 1/00* (2006.01)

(52) U.S. Cl.
CPC ................. *H04B 1/16* (2013.01); *H04B 1/00* (2013.01); *H04B 1/0053* (2013.01)

(58) Field of Classification Search
CPC .... H04B 1/005; H04B 1/0053; H04B 1/0067; H04B 1/04; H04B 1/16
See application file for complete search history.

(56) References Cited

U.S. PATENT DOCUMENTS 8,249,538 B2 * 8/2012 Jin ........................... H04B 1/30 345/169
2002/0042256 A1 4/2002 Baldwin et al.
(Continued)

FOREIGN PATENT DOCUMENTS

CN 101316105 12/2008
CN 102104392 6/2011
(Continued)

OTHER PUBLICATIONS

International Search Report, dated Dec. 30, 2014, in International Application No. PCT/CN2014/076109 (6 pp.).
(Continued)

*Primary Examiner* — Tuan Pham
(74) *Attorney, Agent, or Firm* — Staas & Halsey LLP

(57) ABSTRACT

The present application discloses a signal processing apparatus and method, the method includes: receive an analog signal; adjust a frequency band of the analog signal to a lowest frequency band when a frequency band of the analog signal received by the receiving unit falls outside the lowest frequency band in multiple preconfigured frequency bands; process, by using a signal processing channel in the lowest frequency band, the analog signal whose frequency band has been adjusted to the lowest frequency band. The method provided in the embodiments of the present application processes signals of different frequency bands by using a processing channel in a lowest frequency band. In this way, only a relatively small quantity of radio-frequency link components are required to implement processing of the signals of the different frequency bands, which reduces a link size of a communications system.

28 Claims, 13 Drawing Sheets

Related U.S. Application Data continuation of application No. PCT/CN2014/076109, filed on Apr. 24, 2014.

(56) References Cited

U.S. PATENT DOCUMENTS

| | | | | |
|---|---|---|---|---|
| 2004/0116097 | A1 | 6/2004 | Shen | |
| 2010/0048155 | A1 | 2/2010 | Wang | |
| 2010/0144288 | A1 | 6/2010 | Walley et al. | |
| 2010/0304703 | A1* | 12/2010 | Han | H03D 7/1441 455/324 |
| 2011/0128999 | A1 | 6/2011 | Ruegamer et al. | |
| 2011/0244822 | A1* | 10/2011 | Takeuchi | H04B 1/28 455/307 |
| 2013/0156074 | A1 | 6/2013 | Wang et al. | |
| 2016/0269071 | A1 | 9/2016 | Wu et al. | |
| 2016/0301438 | A1 | 10/2016 | He et al. | |

FOREIGN PATENT DOCUMENTS

| | | |
|---|---|---|
| CN | 102308484 | 1/2012 |
| CN | 102820899 | 12/2012 |
| CN | 103368888 | 10/2013 |
| EP | 1079531 | 2/2001 |

OTHER PUBLICATIONS

Written Opinion of the International Searching Authority, dated Dec. 30, 2014, in International Application No. PCT/CN2014/076109 (9 pp.).

Extended European Search Report, dated Jan. 9, 2017, in European Application No. 14890417.0 (9 pp.).

Office Action, dated May 22, 2017, in Chinese Application No. 201480072223.7 (10 pp.).

Restriction Requirement, dated Jul. 17, 2017, in U.S. Appl. No. 15/292,444 (6 pp.).

Notice of Allowance, dated Oct. 31, 2017, in U.S. Appl. No. 15/292,444 (34 pp.).

U.S. Appl. No. 15/292,444, filed Oct. 13, 2016, Guolong Huang et al., Huawei Technologies Co., Ltd.

* cited by examiner

SIGNAL PROCESSING APPARATUS, METHOD, AND SYSTEM

CROSS-REFERENCE TO RELATED APPLICATIONS

This application is a continuation of U.S. patent application Ser. No. 15/292,444, filed on Oct. 13, 2016, which is a continuation of International Application No. PCT/CN2014/076109, filed on Apr. 24, 2014, All of the afore-mentioned patent applications are hereby incorporated by reference in their entireties.

TECHNICAL FIELD

Embodiments of the present application relate to the field of communications technologies, and specifically, to a signal processing apparatus, method, and system.

BACKGROUND

With a continuous increase of a wireless communication data rate and a user quantity, frequencies and bandwidths of a wireless communications system also increase continuously. In addition, a communications system has been developed from a second generation (2G) wireless communications system into 3G and 4G communications systems.

The 2G wireless communications system mainly uses 900 MHz and 1.8 GHz frequency bands, with a channel bandwidth generally ranging from hundreds of hertz to thousands of hertz. The 3G communications system mainly uses multiple frequency bands of 2 GHz or lower than 2 GHz, with a channel bandwidth generally being several megahertz; and the 4G communications system mainly uses several frequency bands lower than 4 GHz, with a channel bandwidth generally ranging from tens of megahertz to hundreds of megahertz.

In a data transmission process, an existing communications system performs receiving, processing, and transmitting by using a separate antenna and a separate radio-frequency link on multiple different frequency bands, and antennas and radio-frequency links of the multiple frequency bands are basically separate. Therefore, to develop high frequencies and large bandwidths, the communications system requires more radio-frequency link components. For example, an available frequency band of a next-generation 5G mobile communications system may be up to 3 GHz to 100 GHz or even wider. Therefore, when performing data transmission, the next-generation 5G mobile communications system requires a large quantity of radio-frequency link components to complete the data transmission, which causes an overlarge link size of a high-frequency large-bandwidth communications system.

SUMMARY

Embodiments of the present application provide a signal processing apparatus. Only a relatively small quantity of radio-frequency link components are required to implement data transmission in a high-frequency large-bandwidth communications system, which reduces a link size of the high-frequency large-bandwidth communications system. The embodiments of the present application further provide a corresponding method and system.

A first aspect of the present application provides a signal processing apparatus, including:

a receiving unit, configured to receive an analog signal;

a frequency band adjustment unit, configured to adjust the analog signal to a lowest frequency band when a frequency band of the analog signal received by the receiving unit falls outside the lowest frequency band in multiple preconfigured frequency bands; and a processing unit, configured to process, by using a signal processing channel in the lowest frequency band, the analog signal that has been adjusted to the lowest frequency band by the frequency band adjustment unit.

With reference to the first aspect, in a first possible implementation manner, the processing unit includes:

an analog signal splitting subunit, configured to split, according to a preconfigured policy, the analog signal that has been adjusted to the lowest frequency band, so that the analog signal that has been adjusted to the lowest frequency band forms at least two analog sub-signals;

a down-conversion processing subunit, configured to perform down-conversion processing on the at least two analog sub-signals obtained by means of splitting by the analog signal splitting subunit;

an analog-to-digital conversion subunit, configured to perform analog-to-digital conversion on the at least two analog sub-signals obtained after the down-conversion processing subunit performs down-conversion, so as to form at least two digital sub-signals corresponding to the at least two analog sub-signals; and a digital signal aggregation subunit, configured to aggregate, into one digital signal, the at least two digital sub-signals obtained after the analog-to-digital conversion subunit performs analog-to-digital conversion.

With reference to the first possible implementation manner of the first aspect, in a second possible implementation manner, the processing unit further includes: an analog relationship recording subunit, where:

the analog relationship recording subunit is configured to record an association between the analog signal that has been adjusted to the lowest frequency band and the at least two analog sub-signals; and the digital signal aggregation subunit is configured to aggregate the at least two digital sub-signals into the one digital signal according to the association, recorded by the analog relationship recording subunit, between the analog signal that has been adjusted to the lowest frequency band and the at least two analog sub-signals.

With reference to the first or the second possible implementation manner of the first aspect, in a third possible implementation manner, the analog signal splitting subunit is configured to determine, according to a sampling rate of an analog-to-digital converter, a quantity of sub-signals into which the analog signal is to be split, and split the analog signal into analog sub-signals of the quantity of sub-signals by using a power splitting/combining network.

With reference to the first, the second, or the third possible implementation manner of the first aspect, in a fourth possible implementation manner, the processing unit further includes:

a bandwidth decreasing subunit, configured to: before the down-conversion processing subunit performs down-conversion processing on the at least two analog sub-signals, decrease bandwidths of the at least two analog sub-signals, so that bandwidths, obtained after the decrement, of the at least two analog sub-signals are less than or equal to the sampling rate that is of the analog-to-digital converter and is corresponding to the analog sub-signals, and a sum of the bandwidths, obtained after the decrement, of the at least two analog sub-signals remains unchanged.

With reference to the fourth possible implementation manner of the first aspect, in a fifth possible implementation manner, the down-conversion processing subunit is configured to generate a corresponding local-frequency signal according to frequency bands in which the at least two analog sub-signals are located after the bandwidths of the at least two analog sub-signals are decreased by the bandwidth decreasing subunit; and perform, by using the corresponding local-frequency signal, down-conversion processing on the at least two analog sub-signals whose bandwidths have been decreased, to obtain the at least two analog sub-signals obtained after the down-conversion.

With reference to the first aspect or any one of the first to the fifth possible implementation manners of the first aspect, in a sixth possible implementation manner, the frequency band adjustment unit is configured to input the analog signal into a corresponding adjustment channel according to the frequency band of the analog signal, and adjust the analog signal to the lowest frequency band in a manner of performing down-conversion for N times, where N is greater than or equal to 0.

With reference to the sixth possible implementation manner of the first aspect, in a seventh possible implementation manner, the frequency band adjustment unit is configured to: when N is equal to 0, which indicates that the analog signal has already been located in the lowest frequency band, perform only filtering and low-noise amplification on the analog signal; when N is equal to 1, successively perform filtering, low-noise amplification, and down-conversion on the analog signal, and adjust the analog signal to the lowest frequency band; or when N is greater than 1, perform filtering on the analog signal obtained after the former down-conversion, then perform the latter down-conversion, and adjust the analog signal to the lowest frequency band.

A second aspect of the present application provides a signal processing apparatus, including:

a processing unit, configured to process a to-be-transmitted digital signal by using a signal processing channel in a lowest frequency band in multiple preconfigured frequency bands, to form an analog signal;

an adjustment unit, configured to, when a frequency band of the analog signal obtained by the processing unit falls outside a preconfigured transmit frequency band of the digital signal, adjust the analog signal to the preconfigured transmit frequency band; and a transmitting unit, configured to transmit, in the preconfigured transmit frequency band, the analog signal adjusted by the adjustment unit.

With reference to the second aspect, in a first possible implementation manner, the processing unit includes:

a digital signal splitting subunit, configured to split the to-be-transmitted digital signal according to a preconfigured policy, so that the digital signal forms at least two digital sub-signals;

a digital-to-analog conversion subunit, configured to perform digital-to-analog conversion on the at least two digital sub-signals obtained by means of splitting by the digital signal splitting subunit, to correspondingly form at least two analog sub-signals;

an up-conversion processing subunit, configured to perform up-conversion processing on the at least two analog sub-signals obtained after the digital-to-analog conversion subunit performs digital-to-analog conversion; and an analog signal aggregation subunit, configured to aggregate, into the analog signal, the at least two analog sub-signals obtained after the up-conversion processing subunit performs up-conversion.

With reference to the first possible implementation manner of the second aspect, in a second possible implementation manner, the processing unit further includes: a digital relationship recording subunit, where:

the digital relationship recording subunit is configured to record an association between the digital signal and the at least two digital sub-signals obtained after the digital signal splitting subunit splits the digital signal; and the analog signal aggregation subunit is configured to aggregate the at least two analog sub-signals obtained after the up-conversion into the analog signal by using a power splitting/combining network according to the association, recorded by the digital relationship recording subunit, between the digital signal and the at least two digital sub-signals.

With reference to the first or the second possible implementation manner of the second aspect, in a third possible implementation manner, the digital signal splitting subunit is configured to determine, according to a sampling rate of an analog-to-digital converter, a quantity of sub-signals into which the digital signal is to be split, and split the digital signal into digital sub-signals of the quantity of sub-signals.

With reference to the first, the second, or the third possible implementation manner of the second aspect, in a fourth possible implementation manner, the up-conversion processing subunit is configured to determine, according to the preconfigured transmit frequency band, to-be-up-converted sub-bands corresponding to the at least two analog sub-signals, generate corresponding local-frequency signals according to the to-be-up-converted sub-bands corresponding to the at least two analog sub-signals, and perform up-conversion processing on the at least two analog sub-signals by using the corresponding local-frequency signals, so that the at least two analog sub-signals are up-converted to the corresponding up-conversion sub-bands, to obtain the at least two analog sub-signals obtained after the up-conversion.

With reference to the fourth possible implementation manner of the second aspect, in a fifth possible implementation manner, the processing unit further includes:

a frequency band determining subunit, configured to determine, according to the to-be-up-converted sub-bands that are corresponding to the at least two analog sub-signals and are determined by the up-conversion processing subunit, a to-be-up-converted frequency band corresponding to the digital signal; and a bandwidth increasing subunit, configured to increase bandwidths of the at least two analog sub-signals obtained after the up-conversion processing subunit performs up-conversion processing, so that frequency bands of the at least two analog sub-signals whose bandwidths are increased are restored to the to-be-up-converted frequency band that is corresponding to the digital signal and is determined by the frequency band determining subunit.

With reference to the second aspect or any one of the first to the fifth possible implementation manners of the second aspect, in a sixth possible implementation manner, the adjustment unit is configured to input the analog signal into a corresponding adjustment channel according to the preconfigured transmit frequency band, and adjust the analog signal to the preconfigured transmit frequency band in a manner of performing up-conversion for N times, where N is greater than or equal to 0.

With reference to the sixth possible implementation manner of the second aspect, in a seventh possible implementation manner, the adjustment unit is configured to: when N is equal to 0, which indicates that the analog signal has already been located in the preconfigured transmit frequency band, perform only direct amplification on the analog signal; or when N is greater than or equal to 1, perform filtering on the analog signal obtained after up-conversion is performed each time, amplify the analog signal obtained after last-time filtering, and adjust the analog signal to the preconfigured transmit frequency band.

A third aspect of the present application provides a signal processing method, including:

receiving an analog signal;

adjusting the analog signal to a lowest frequency band when a frequency band of the analog signal falls outside the lowest frequency band in multiple preconfigured frequency bands; and processing, by using a signal processing channel in the lowest frequency band, the analog signal that has been adjusted to the lowest frequency band.

With reference to the third aspect, in a first possible implementation manner, the processing, by using a signal processing channel in the lowest frequency band, the analog signal that has been adjusted to the lowest frequency band includes:

splitting, according to a preconfigured policy, the analog signal that has been adjusted to the lowest frequency band, so that the analog signal that has been adjusted to the lowest frequency band forms at least two analog sub-signals;

performing down-conversion processing on the at least two analog sub-signals;

performing analog-to-digital conversion on the at least two analog sub-signals obtained after the down-conversion, so as to form at least two digital sub-signals corresponding to the at least two analog sub-signals; and aggregating the at least two digital sub-signals into one digital signal.

With reference to the first possible implementation manner of the third aspect, in a second possible implementation manner, when the analog signal that has been adjusted to the lowest frequency band is split according to the preconfigured policy, the method further includes:

recording an association between the analog signal that has been adjusted to the lowest frequency band and the at least two analog sub-signals; and the aggregating the at least two digital sub-signals into one digital signal includes:

aggregating the at least two digital sub-signals into the one digital signal according to the association between the analog signal that has been adjusted to the lowest frequency band and the at least two analog sub-signals.

With reference to the first or the second possible implementation manner of the third aspect, in a third possible implementation manner, the splitting, according to a preconfigured policy, the analog signal that has been adjusted to the lowest frequency band includes:

determining, according to a sampling rate of an analog-to-digital converter, a quantity of sub-signals into which the analog signal is to be split; and splitting the analog signal into analog sub-signals of the quantity of sub-signals by using a power splitting/combining network.

With reference to the first, the second, or the third possible implementation manner of the third aspect, in a fourth possible implementation manner, before the performing down-conversion processing on the at least two analog sub-signals, the method further includes:

decreasing bandwidths of the at least two analog sub-signals, so that bandwidths, obtained after the decrement, of the at least two analog sub-signals are less than or equal to the sampling rate that is of the analog-to-digital converter and is corresponding to the analog sub-signals, and a sum of the bandwidths, obtained after the decrement, of the at least two analog sub-signals remains unchanged.

With reference to the fourth possible implementation manner of the third aspect, in a fifth possible implementation manner, the performing down-conversion processing on the at least two analog sub-signals includes:

generating a corresponding local-frequency signal according to frequency bands in which the at least two analog sub-signals are located after the bandwidths of the at least two analog sub-signals are decreased; and performing, by using the corresponding local-frequency signal, down-conversion processing on the at least two analog sub-signals whose bandwidths have been decreased, to obtain the at least two analog sub-signals obtained after the down-conversion.

With reference to the third aspect or any one of the first to the fifth possible implementation manners of the third aspect, in a sixth possible implementation manner, the adjusting the analog signal to a lowest frequency band when a frequency band of the analog signal falls outside the lowest frequency band in multiple preconfigured frequency bands includes:

inputting the analog signal into a corresponding adjustment channel according to the frequency band of the analog signal; and adjusting the analog signal to the lowest frequency band in a manner of performing down-conversion for N times, where N is greater than or equal to 0.

With reference to the sixth possible implementation manner of the third aspect, in a seventh possible implementation manner, when N is equal to 0, the adjusting the analog signal to the lowest frequency band includes:

when N is equal to 0, which indicates that the analog signal has already been located in the lowest frequency band, performing only filtering and low-noise amplification on the analog signal; or when N is greater than or equal to 1, the adjusting the analog signal to the lowest frequency band includes:

when N is equal to 1, successively performing filtering, low-noise amplification, and down-conversion on the analog signal, and adjusting the analog signal to the lowest frequency band; or when N is greater than 1, performing filtering on the analog signal obtained after the former down-conversion, then performing the latter down-conversion, and adjusting the analog signal to the lowest frequency band.

A fourth aspect of the present application provides a signal processing method, including:

processing a to-be-transmitted digital signal by using a signal processing channel in a lowest frequency band in multiple preconfigured frequency bands, to form an analog signal;

adjusting, when a frequency band of the analog signal falls outside a preconfigured transmit frequency band of the digital signal, the analog signal to the preconfigured transmit frequency band; and transmitting the adjusted analog signal in the preconfigured transmit frequency band.

With reference to the fourth aspect, in a first possible implementation manner, the processing a to-be-transmitted digital signal by using a signal processing channel in a lowest frequency band in multiple preconfigured frequency bands, to form an analog signal includes:

splitting the to-be-transmitted digital signal according to a preconfigured policy, so that the digital signal forms at least two digital sub-signals;

performing digital-to-analog conversion on the at least two digital sub-signals, to correspondingly form at least two analog sub-signals;

performing up-conversion processing on the at least two analog sub-signals; and aggregating, into the analog signal, the at least two analog sub-signals obtained after the up-conversion.

With reference to the first possible implementation manner of the fourth aspect, in a second possible implementation manner, when the to-be-transmitted digital signal is split according to the preconfigured policy, the method further includes:

recording an association between the digital signal and the at least two digital sub-signals obtained after the digital signal is split; and the aggregating, into the analog signal, the at least two analog sub-signals obtained after the up-conversion includes:

aggregating the at least two analog sub-signals obtained after the up-conversion into the analog signal by using a power splitting/combining network according to the association between the digital signal and the at least two digital sub-signals.

With reference to the first or the second possible implementation manner of the fourth aspect, in a third possible implementation manner, the splitting the to-be-transmitted digital signal according to a preconfigured policy includes:

determining, according to a sampling rate of an analog-to-digital converter, a quantity of sub-signals into which the digital signal is to be split; and splitting the digital signal into digital sub-signals of the quantity of sub-signals.

With reference to the first, the second, or the third possible implementation manner of the fourth aspect, in a fourth possible implementation manner, the performing up-conversion processing on the at least two analog sub-signals includes:

determining, according to the preconfigured transmit frequency band, to-be-up-converted sub-bands corresponding to the at least two analog sub-signals;

generating corresponding local-frequency signals according to the to-be-up-converted sub-bands corresponding to the at least two analog sub-signals; and performing up-conversion processing on the at least two analog sub-signals by using the corresponding local-frequency signals, so that the at least two analog sub-signals are up-converted to the corresponding up-conversion sub-bands, to obtain the at least two analog sub-signals obtained after the up-conversion.

With reference to the fourth possible implementation manner of the fourth aspect, in a fifth possible implementation manner, after the performing up-conversion processing on the at least two analog sub-signals, the method further includes:

determining, according to the to-be-up-converted sub-bands corresponding to the at least two analog sub-signals, a to-be-up-converted frequency band corresponding to the digital signal; and increasing bandwidths of the at least two analog sub-signals obtained after the up-conversion processing, so that frequency bands of the at least two analog sub-signals whose bandwidths are increased are restored to the to-be-up-converted frequency band corresponding to the digital signal.

With reference to the fourth aspect or any one of the first to the fifth possible implementation manners of the fourth aspect, in a sixth possible implementation manner, the adjusting, when a frequency band of the analog signal falls outside a preconfigured transmit frequency band of the digital signal, the analog signal to the preconfigured transmit frequency band includes:

inputting the analog signal into a corresponding adjustment channel according to the preconfigured transmit frequency band; and adjusting the analog signal to the preconfigured transmit frequency band in a manner of performing up-conversion for N times, where N is greater than or equal to 0.

With reference to the sixth possible implementation manner of the fourth aspect, in a seventh possible implementation manner, when N is equal to 0, the adjusting the analog signal to the preconfigured transmit frequency band includes:

when N is equal to 0, which indicates that the analog signal has already been located in the preconfigured transmit frequency band, performing only direct amplification on the analog signal; or when N is greater than or equal to 1, performing filtering on the analog signal obtained after up-conversion is performed each time, amplifying the analog signal obtained after last-time filtering, and adjusting the analog signal to the preconfigured transmit frequency band.

In the prior art, receiving, processing, and transmitting are performed separately by using an independent antenna and an independent radio-frequency link in multiple different frequency bands. By contrast, in the embodiments of the present application, signals of different frequency bands are processed by using a processing channel in a lowest frequency band either in a receiving process or in a transmitting process. In this way, only a relatively small quantity of radio-frequency link components are required to implement receiving and transmitting of the signals of the different frequency bands, which reduces a link size of a communications system.

BRIEF DESCRIPTION OF DRAWINGS

To describe the technical solutions in the embodiments of the present application more clearly, the following briefly introduces the accompanying drawings required for describing the embodiments. Apparently, the accompanying drawings in the following description show merely some embodiments of the present application, and persons skilled in the art may still derive other drawings from these accompanying drawings without creative efforts.

DESCRIPTION OF EMBODIMENTS

Embodiments of the present application provide a signal processing apparatus. Only a relatively small quantity of radio-frequency link components are required to implement data transmission in a high-frequency large-bandwidth communications system, which reduces a link size of the high-frequency large-bandwidth communications system. The embodiments of the present application further provide a corresponding method and system. Detailed descriptions are separately provided in the following.

The following clearly describes the technical solutions in the embodiments of the present application with reference to the accompanying drawings in the embodiments of the present application. Apparently, the described embodiments are merely some but not all of the embodiments of the present application. All other embodiments obtained by persons skilled in the art based on the embodiments of the present application without creative efforts shall fall within the protection scope of the present application.

A transceiver system in an embodiment of the present application may be a base station.

Figure 1:
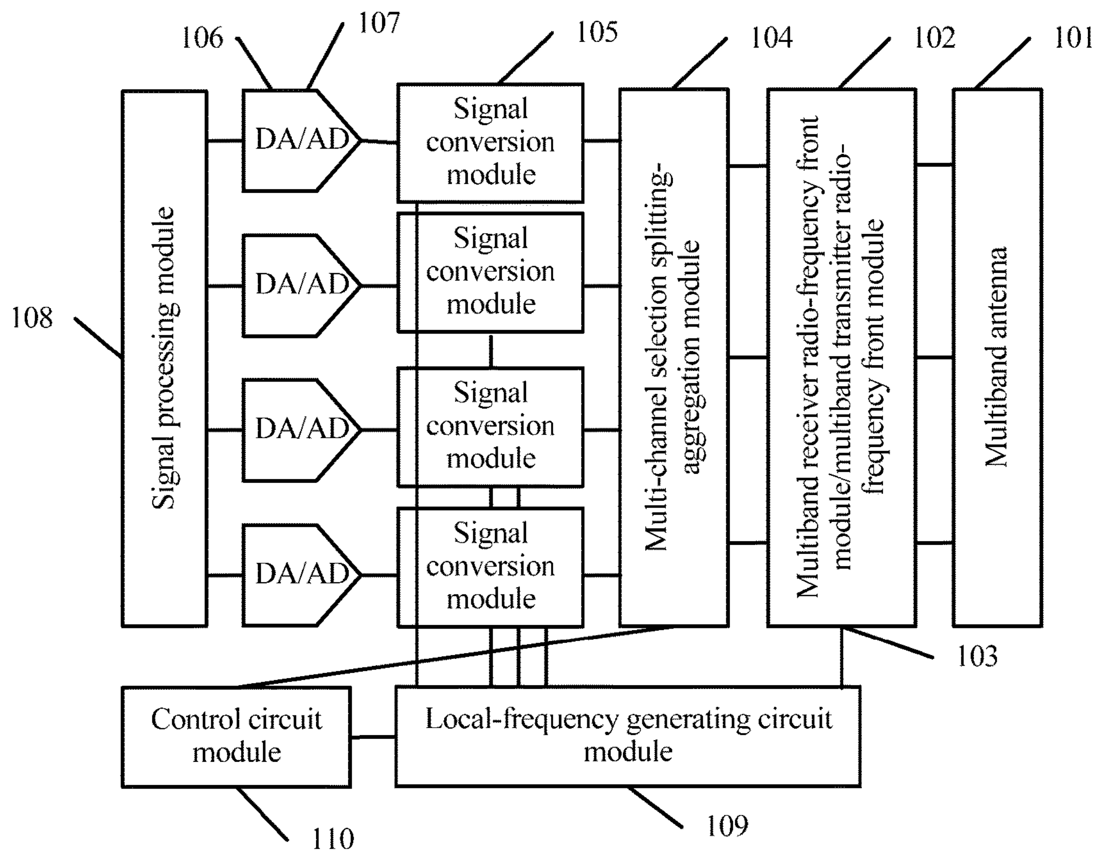
FIG. 1 is a schematic diagram of an embodiment of a transceiver system according to the present application.

Referring to FIG. 1, an embodiment of a transceiver system provided in the present application includes:

a multiband antenna 101, a multiband receiver radio-frequency front module 102, a multiband transmitter radio-frequency front module 103, a multi-channel selection splitting-aggregation module 104, a signal conversion module 105, an analog-to-digital converter 106, a digital-to-analog converter 107, a signal processing module 108, a local-frequency generating circuit module 109, and a control circuit module 110.

The multiband antenna 101 is configured to transmit or receive signals of multiple frequency bands.

If the transceiver system in this embodiment of the present application can implement coverage of an available frequency band of 3-100 GHz (including 3 and 100), the multiband antenna 101 can receive a signal of 3-100 GHz. Frequency band division within a range of 3-100 GHz is preset, which may be divided into three frequency band ranges, or may be divided into five frequency band ranges. There is no limitation on a specific quantity. Each antenna port is corresponding to a preconfigured frequency band, and frequency band ranges may be not overlapped, or may be overlapped. For example, the frequency band may be divided into three frequency band ranges: 3-12 GHz (including 3 and 12), 12-40 GHz (including 12 and 40), and 40-100 GHz (including 40 and 100), or may be divided into three frequency band ranges: 3-14 GHz (including 3 and 14), 12-40 GHz (including 12 and 40), and 38-100 GHz (including 38 and 100). When frequency band ranges are overlapped, if a frequency band of a signal is exactly the overlapping part, for example, 12-14 GHz (including 12 and 14), the signal may be transmitted or received through an antenna port of the frequency band of 3-14 GHz, or may be transmitted or received through an antenna port of the frequency band of 12-40 GHz.

Figure 2:
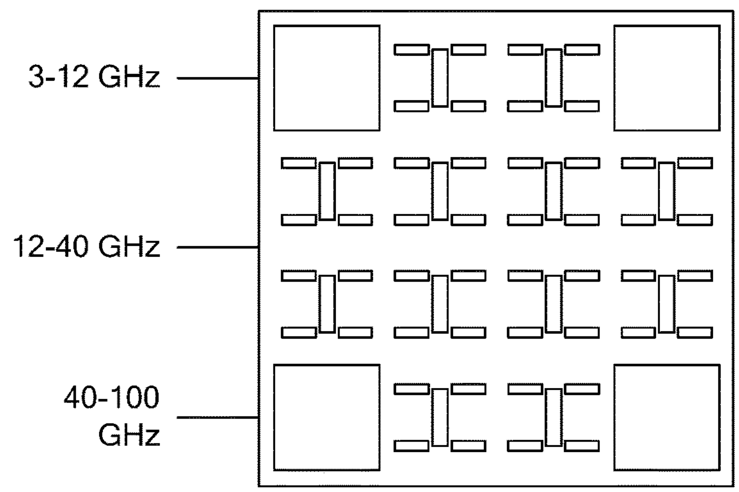
FIG. 2 is a schematic structural diagram of a multiband antenna according to an embodiment of the present application.

A schematic diagram of the multiband antenna 101 may be understood with reference to FIG. 2 by using an example in which the frequency band is divided into three frequency band ranges: 3-12 GHz, 12-40 GHz, and 40-100 GHz.

The multiband receiver radio-frequency front module 102 is configured to perform down-conversion processing on a received signal according to a preset frequency band. A specific structure of the multiband receiver radio-frequency front module 102 may be understood with reference to FIG. 3.

Figure 3:
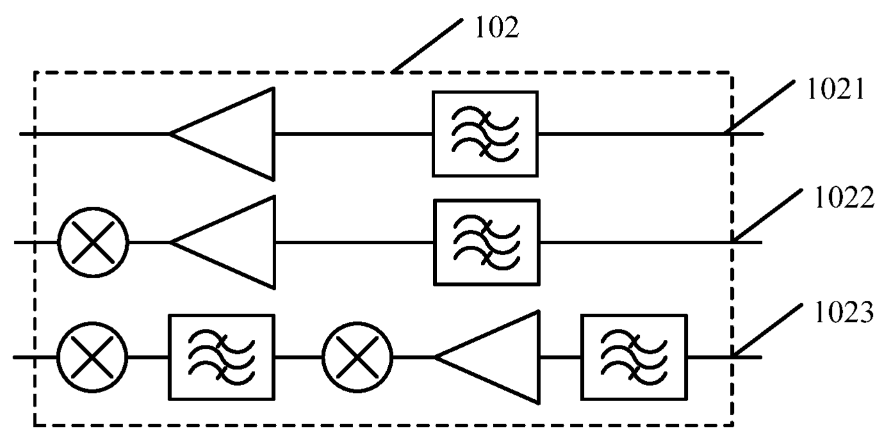
FIG. 3 is a schematic structural diagram of a multiband receiver radio-frequency front module according to an embodiment of the present application.

FIG. 3 is a structural diagram of the multiband receiver radio-frequency front module 102 when there are three preconfigured frequency bands. For example, the three preconfigured frequency bands are 3-12 GHz, 12-40 GHz, and 40-100 GHz. The multiband receiver radio-frequency front module 102 includes three channels, which are a channel 1021 corresponding to 3-12 GHz, a channel 1022 corresponding to 12-40 GHz, and a channel 1023 corresponding to 40-100 GHz. The channel 1021 includes one band-pass filter, and one low-noise amplifier of 3-12 GHz; and filtering and amplification may be performed, by using the channel 1021, on a signal received in the frequency band of 3-12 GHz. The channel 1022 includes one band-pass filter, one low-noise amplifier of 12-40 GHz, and one frequency mixer; and a signal received by an antenna in the frequency band of 12-40 GHz may be converted into a signal of the frequency band of 3-12 GHz by using the channel 1022. The channel 1023 includes two band-pass filters, one low-noise amplifier of 40-100 GHz, and two frequency mixers. After filtering and low-noise amplification of 40-100 GHz are performed once, by using the channel 1023, on a signal received by an antenna in 40-100 GHz, down-conversion may be performed once on the signal by using a frequency mixer, so that the signal is down-converted from 40-100 GHz to 12-40 GHz. Then, after filtering is performed once again, the signal is down-converted once again by using the other frequency mixer, so that the signal is down-converted from 12-40 GHz to 3-12 GHz.

The multiband transmitter radio-frequency front module 103 is configured to perform up-conversion processing on a to-be-transmitted signal according to a preset frequency band. A specific structure of the multiband transmitter radio-frequency front module 103 may be understood with reference to FIG. 4.

Figure 4:
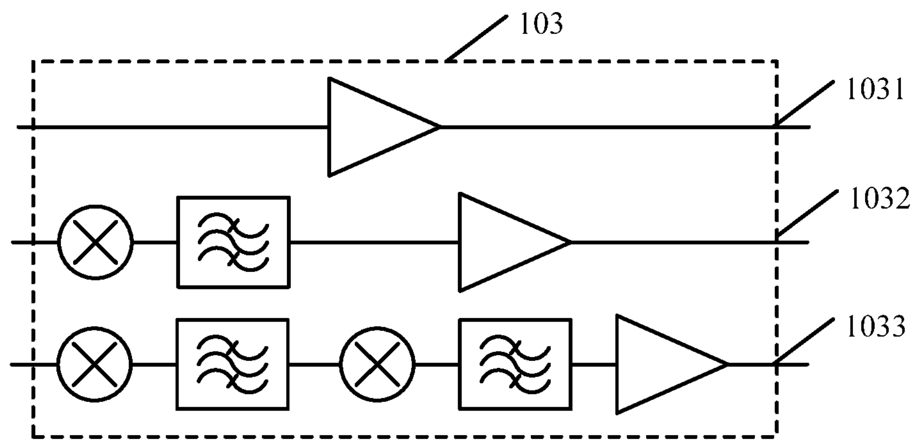
FIG. 4 is a schematic structural diagram of a multiband transmitter radio-frequency front module according to an embodiment of the present application.

FIG. 4 is a structural diagram of the multiband transmitter radio-frequency front module 103 when there are three preconfigured frequency bands. For example, the three preconfigured frequency bands are 3-12 GHz, 12-40 GHz, and 40-100 GHz. The multiband transmitter radio-frequency front module 103 includes three channels, which are a channel 1031 corresponding to 3-12 GHz, a channel 1032 corresponding to 12-40 GHz, and a channel 1033 corresponding to 40-100 GHz. The channel 1031 is a direct amplification channel, including one amplifier of the frequency band of 3-12 GHz; and a to-be-transmitted signal may be amplified by using the channel 1031 and then output to an antenna port of the frequency band of 3-12 GHz. The channel 1032 includes one frequency mixer, one band-pass filter, and one amplifier of 12-40 GHz; and a to-be-transmitted signal may be up-converted to the frequency band of 12-40 GHz in the channel 1032 by using the frequency mixer, and after passing the band-pass filter and the amplifier of the frequency band of 12-40 GHz, may be output to an antenna port of the frequency band of 12-40 GHz. The channel 1033 includes two frequency mixers, two band-pass filters, and one amplifier of 40-100 GHz. A to-be-transmitted signal may be up-converted to the frequency band of 12-40 GHz in the channel 1033 by using the one frequency mixer; and after being filtered by one band-pass filter, the signal may be up-converted to the frequency band of 40-100 GHz by using the other frequency mixer, and after passing a band-pass filter and the one amplifier of the frequency band of 40-100 GHz, may be output to an antenna port of the frequency band of 40-100 GHz.

The local-frequency generating circuit module generates local-frequency signals of frequency mixers in the three channels: the channel 1031, the channel 1032, and the channel 1033.

The multi-channel selection splitting-aggregation module 104 is configured to split a received signal according to a sampling rate of the analog-to-digital converter 106, and aggregate sub-signals of a to-be-transmitted signal into a to-be-transmitted signal.

Figure 5:
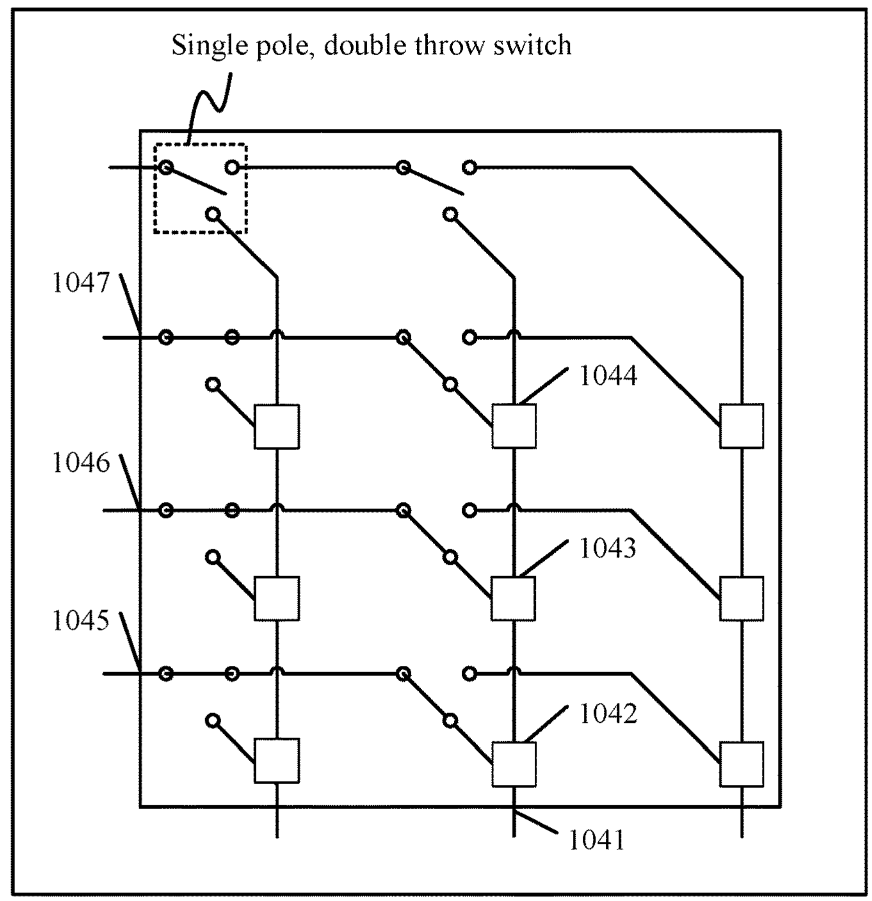
FIG. 5 is a schematic structural diagram of a multi-channel selection splitting-aggregation module according to an embodiment of the present application.

The multi-channel selection splitting-aggregation module 104 may be implemented by using a single pole, double throw switch array, and may be specifically understood with reference to FIG. 5.

A single pole, double throw switch array shown in FIG. 5 is only exemplary. There are four channels that connect the single pole, double throw switch array shown in FIG. 5 and the signal conversion module 105, and there are three channels that connect the single pole, double throw switch array shown in FIG. 5 and the multiband receiver radio-frequency front module 102 or the multiband transmitter radio-frequency front module 103. Actually, the single pole, double throw switch array may be flexibly designed according to a quantity of preset frequency bands as required. The single pole, double throw switch array includes a power splitter/combiner, where the power splitter/combiner is configured to equally split a received signal on a power basis without a change of a bandwidth, and perform combination processing on to-be-transmitted signals, so that multiple signals are combined into one signal. Opening and closing of a switch in the single pole, double throw switch array may be controlled by the control circuit module 110.

That a frequency band of the signal received by the multi-channel selection splitting-aggregation module 104 is 5-8 GHz is used as an example. According to a sampling rate of the analog-to-digital converter 106, the signal whose frequency band is 5-8 GHz needs to be split into three sub-signals. A splitting process may be as follows: The signal whose frequency band is 5-8 GHz enters the single pole, double throw switch array from 1041; and one sub-signal is obtained by means of splitting at 1042 and is output from 1045, one sub-signal is obtained by means of splitting from the remaining of the signal at 1043 and is output from 1046, and finally, the remaining one sub-signal enters 1044 and is output from 1047. An aggregation process is reverse to the splitting process.

In this embodiment of the present application, when signal splitting is performed according to the sampling rate of the analog-to-digital converter 106 or a sampling rate of the digital-to-analog converter 107, bandwidths of sub-signals obtained by means of splitting may be the same as the sampling rate, or may be lower than the sampling rate.

The signal conversion module 105 is configured to perform down-conversion processing on sub-signals obtained by means of splitting by the multi-channel selection splitting-aggregation module 104, or perform up-conversion processing on a signal obtained by means of conversion by the digital-to-analog converter 107.

The signal conversion module 105 is further configured to perform analog modulation and demodulation on a signal of a lowest frequency band. Local-frequency signals, of the lowest frequency band, on multiple channels on which signal combination needs to be implemented are different from each other. This ensures that there is no overlapping frequency band in a frequency spectrum after the signal combination on the multiple channels, and meets filtering performance allowed by a filter in the system.

Figure 6:
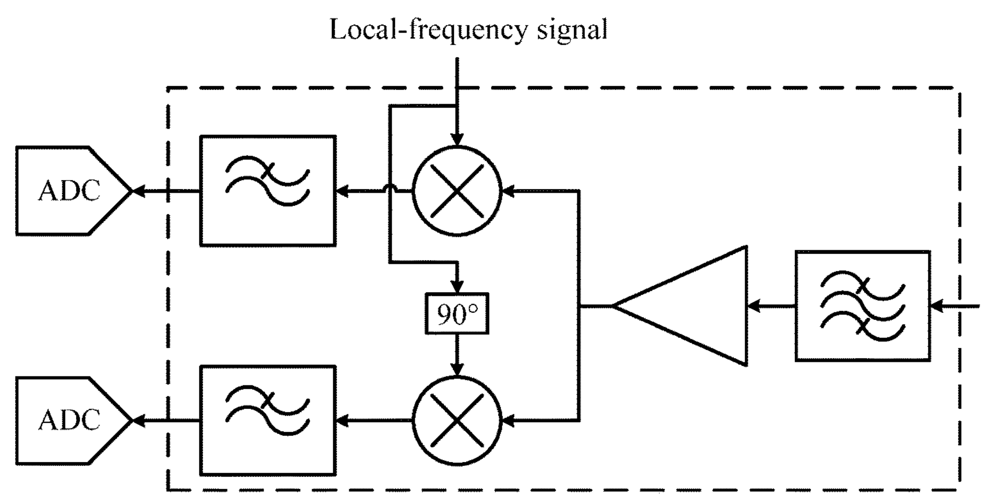
FIG. 6 is a schematic structural diagram of a circuit of a receive part of a signal conversion module according to an embodiment of the present application.
Figure 7:
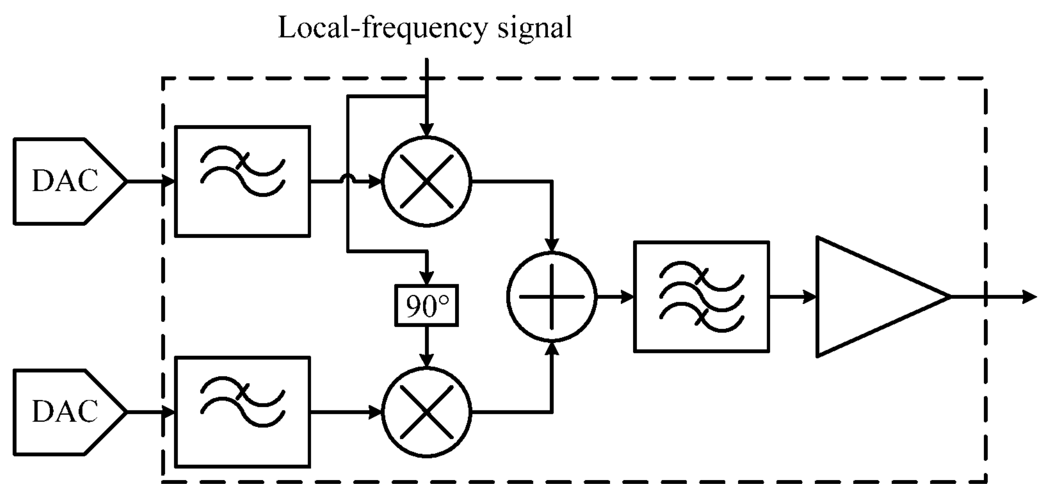
FIG. 7 is a schematic structural diagram of a circuit of a transmit part of a signal conversion module according to an embodiment of the present application.

A circuit structure of the signal conversion module 105 includes a transmit part and a receive part, where a circuit structure of the receive part may be understood with reference to FIG. 6, and a circuit structure of the transmit part may be understood with reference to FIG. 7. The circuit structure of the receive part, as shown in FIG. 6, of the signal conversion module 105 includes a band-pass filter, an amplifier, two frequency mixers, and two low-pass filters from a perspective of a receive signal passing sequence.

A bandwidth of a sub-signal output from the multi-channel selection splitting-aggregation module 104 is decreased in the first filter. For example, after one original signal of 5-8 GHz is split into three sub-signals, a bandwidth of each sub-signal is still 5-8 GHz; after the three sub-signals pass through the band-pass filter, the bandwidths of the three sub-signals are respectively decreased to 5-6 GHz for one sub-signal, 6-7 GHz for one sub-signal, and 7-8 GHz for one sub-signal. Actually, the bandwidths of the three sub-signals may also be decreased to 5-5.5 GHz for one sub-signal, 5.5-7 GHz for one sub-signal, and 7-8 GHz for one sub-signal, as long as bandwidths, obtained after the decrement, of the three sub-signals are less than or equal to a half of the sampling rate of the analog-to-digital converter, and a sum of the bandwidths, obtained after the decrement, of the three sub-signals remains 3 GHz. After being amplified by using the amplifier, the three sub-signals are down-converted and properly demodulated separately in the two frequency mixers and become sub-signals that meet a conversion condition. That a sub-signal meets a conversion condition refers to that frequencies of at least two of the sub-signals are decreased to be less than or equal to a half of the sampling rate of the analog-to-digital converter. For example, when the sampling rate of the analog-to-digital converter is 1 GHz, and down-conversion processing is performed on the signal of 5-6 GHz, the control circuit module 110 controls the local-frequency generating circuit module 109 to send out a local-frequency signal of 5.5 GHz, so that the signal of 5-6 GHz is down-converted to 0-500 MHz. Likewise, the signal of 6-7 GHz may be down-converted to 0-500 MHz by using a local-frequency signal of 6.5 GHz, and the signal of 7-8 GHz may be down-converted to 0-500 MHz by using a local-frequency signal of 7.5 GHz. After the down-conversion, after being filtered by using the low-pass filters, the three sub-signals enter the analog-to-digital converter 106 for analog-to-digital conversion.

The analog-to-digital converter (ADC) 106 is configured to convert an analog signal to a digital signal.

The digital-to-analog converter (DAC) 107 is configured to convert a digital signal to an analog signal.

When executing a function of a receive end, the signal processing module 108 may aggregate at least two digital sub-signals into one digital signal according to a recorded association between an analog signal and at least two analog sub-signals obtained by means of splitting.

The digital sub-signals are corresponding to the analog sub-signals. When executing the function of the receive end, the signal processing module 108 aggregates the at least two digital sub-signals into one digital signal according to the association, acquired from the control circuit module 110, between the analog signal and the at least two analog sub-signals obtained by means of splitting.

For example, three digital sub-signals of 0-500 MHz that have an association with each other are aggregated into one digital signal.

When executing a function of a transmit end, the signal processing module 108 may split a digital signal in at least two digital signals according to the sampling rate of the digital-to-analog converter, so that the digital signal forms at least two digital sub-signals; and record an association between the digital signal and the at least two digital sub-signals obtained by means of splitting, and record a preconfigured transmit frequency band for transmitting the digital signal.

The local-frequency generating circuit module 109 is configured to generate local-frequency signals required by the signal conversion module 105, the multiband receiver radio-frequency front module 102, and the multiband transmitter radio-frequency front module 103.

The control circuit module 110 is configured to control an action of each module in the entire transceiver system.

For example, the control circuit module 110 controls an output signal frequency of the local-frequency generating circuit module 109, controls splitting and aggregation performed by the multi-channel selection splitting-aggregation module 104 on an analog signal, and which channel of the multiband transmitter radio-frequency front module 103 is to be entered after the aggregation, and controls aggregation and splitting performed by the signal processing module 108 on a digital signal.

The following briefly describes a process of receiving a signal and a process of transmitting a signal in the transceiver system provided in this embodiment of the present application.

It is assumed that the multiband antenna 101 has three ports, and frequency bands of the three ports are 3-12 GHz, 12-40 GHz, and 40-100 GHz.

That three analog signals are received at a same moment is used as an example for description. It is assumed that a first analog signal, a second analog signal, and a third analog signal are received from the three ports, and frequency bands of the three analog signals are 5-8 GHz, 13-14 GHz, and 41-42 GHz. After the multiband antenna 101 receives the three analog signals, the signal of 5-8 GHz enters the channel 1021 in the multiband receiver radio-frequency front module 102 shown in FIG. 3, and after filtering and amplification processing are performed in the channel 1021, a signal of 5-8 GHz is output; the signal of 13-14 GHz enters the channel 1022, and after filtering, amplification, and down-conversion processing are performed in the channel 1022, a signal of 4-5 GHz is output; and the signal of 41-42 GHz enters the channel 1023, and after filtering and amplification, and down-conversion are performed in the channel 1023, the signal of 41-42 becomes a signal of 13-14 GHz, and after filtering and down-conversion are performed once again, a signal of 4-5 GHz is output.

The three analog signals output from the three channels enter the multi-channel selection splitting-aggregation module 104. When the sampling rate of the analog-to-digital converter is 1 GHz, the first analog signal is split into three analog sub-signals, the second analog signal is split into two analog sub-signals, and the third analog signal is split into two analog sub-signals. A specific splitting process may be understood with reference to the description shown in FIG. 5, which is not described herein.

Bandwidth decrement and down-conversion are performed in the signal conversion module 105 on the seven analog sub-signals obtained after splitting, so that bandwidths, obtained after the decrement, of at least two analog sub-signals are less than or equal to the sampling rate that is of the analog-to-digital converter and is corresponding to the analog sub-signals, and a sum of the bandwidths, obtained after the decrement, of the at least two analog sub-signals remains unchanged. The local-frequency generating circuit module 109 generates a corresponding local-frequency signal according to frequency bands in which the at least two analog sub-signals are located after the bandwidths of the at least two analog sub-signals are decreased; and performs, by using the corresponding local-frequency signal, down-conversion processing on the at least two analog sub-signals whose bandwidths have been decreased, to obtain the at least two analog sub-signals obtained after the down-conversion.

The analog-to-digital converter 106 converts, into digital sub-signals, the seven analog sub-signals obtained by means of the down-conversion.

The signal processing module 108 acquires, from the circuit module 110, an association, recorded by the circuit module 110, between the three analog signals and the at least two analog sub-signals obtained by means of splitting, and aggregates the seven digital sub-signals into three digital signals according to the recorded association between the three analog signals and the at least two analog sub-signals obtained by means of splitting.

When it is assumed that a signal transmitter needs to transmit a first digital signal, a second digital signal, and a third digital signal respectively in 5-8 GHz, 13-14 GHz, and 41-42 GHz, the signal processing module 108 splits the three digital signals according to the sampling rate of the digital-to-analog converter 107. When the sampling rate of the digital-to-analog converter 107 is 1 GHz, the signal processing module 108 may split the first digital signal into three digital sub-signals of 0-500 MHz, split the second digital signal into two digital sub-signals of 0-500 MHz, and split the third digital signal into two digital sub-signals of 0-500 MHz.

After being converted by the digital-to-analog converter 107, the seven digital sub-signals become seven analog sub-signals.

A transmit circuit part in the signal conversion module 105 converts the seven analog sub-signals to sub-signals whose frequency band range falls within 3-12 GHz. A specific principle of up-conversion may be understood with reference to the description shown in FIG. 7, and details are not described herein.

According to an instruction of the control circuit module 110 and according to a frequency band that is required for transmitting each of the digital signals and is recorded by the signal processing module 108, the multi-channel selection splitting-aggregation module 104 aggregates the three analog sub-signals of the first signal into one analog signal, with the frequency band restored to 5-8 GHz; aggregates the two analog sub-signals of the second signal into one analog signal, with the frequency band restored to 4-5 GHz; and aggregates the two analog sub-signals of the third signal into one analog signal, with the frequency band restored to 4-5 GHz. Then, according to the instruction of the control circuit module 110 and frequency bands required for transmitting the three analog signals, the multi-channel selection splitting-aggregation module 104 sends a first analog signal to the channel 1031 in the multiband transmitter radio-frequency front module 103, and after being amplified in the channel 1031, the first analog signal is transmitted through an antenna port of 3-12 GHz. A second analog signal is sent to the channel 1032, and after frequency mixing, filtering, and amplification processing are performed in the channel 1032, the second analog signal is restored to a signal of 13-14 GHz and is output through an antenna port of 12-40 GHz. A third analog signal is sent to the channel 1033, and after frequency mixing and filtering are performed in the channel 1033, frequency mixing and filtering are performed again, and amplification processing is performed, the third analog signal is restored to a signal of 41-42 GHz and is output through an antenna port of 40-100 GHz.

In the prior art, receiving, processing, and transmitting are performed separately by using an independent antenna and an independent radio-frequency link in multiple different frequency bands. By contrast, in this embodiment of the present application, signals of different frequency bands are processed by using a processing channel in a lowest frequency band either in a receiving process or in a transmitting process. In this way, only a relatively small quantity of radio-frequency link components are required to implement receiving and transmitting of the signals of the different frequency bands, which reduces a link size of a communications system.

in addition, in this embodiment of the present application, when the signals of the different frequency bands are processed by using the processing channel in the lowest frequency band, a large-bandwidth signal may be split according to a sampling rate of an analog-to-digital converter or a digital-to-analog converter, so that only an analog-to-digital converter or a digital-to-analog converter of a low sampling rate is required to implement analog-to-digital or digital-to-analog conversion processing on the signal, and there is no need to specially manufacture an analog-to-digital converter or a digital-to-analog converter of a high sampling rate. In this way, a difficulty in constructing a communications system is further reduced.

Figure 8:
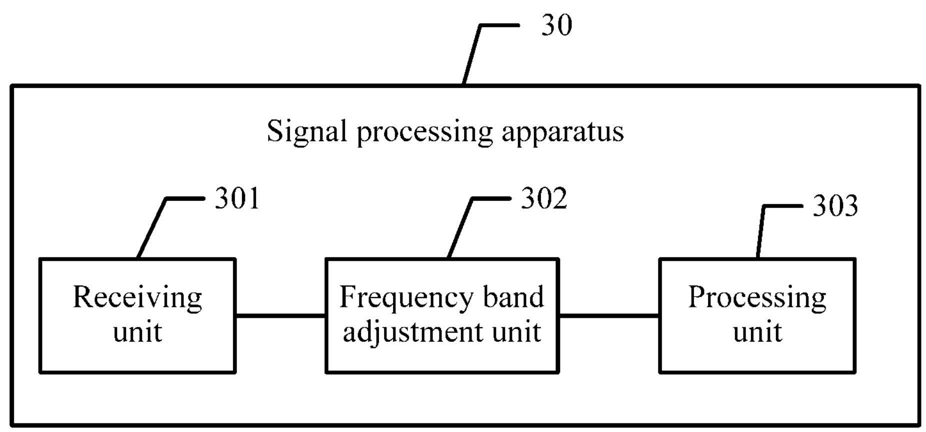
FIG. 8 is a schematic diagram of an embodiment of a signal processing apparatus according to the present application.

Referring to FIG. 8, an embodiment of a signal processing apparatus 30 provided in an embodiment of the present application includes:

a receiving unit 301, configured to receive an analog signal;

a frequency band adjustment unit 302, configured to adjust the analog signal to a lowest frequency band when a frequency band of the analog signal received by the receiving unit 301 falls outside the lowest frequency band in multiple preconfigured frequency bands; and a processing unit 303, configured to process, by using a signal processing channel in the lowest frequency band, the analog signal that has been adjusted to the lowest frequency band by the frequency band adjustment unit 302.

In this embodiment of the present application, a receiving unit 301 receives an analog signal; a frequency band adjustment unit 302 adjusts the analog signal to a lowest frequency band when a frequency band of the analog signal received by the receiving unit 301 falls outside the lowest frequency band in multiple preconfigured frequency bands; and a processing unit 303 processes, by using a signal processing channel in the lowest frequency band, the analog signal that has been adjusted to the lowest frequency band by the frequency band adjustment unit 302. In the prior art, receiving, processing, and transmitting are performed separately by using an independent antenna and an independent radio-frequency link in multiple different frequency bands. By contrast, the signal processing apparatus provided in this embodiment of the present application can process signals of different frequency bands by using a processing channel in a lowest frequency band in a signal receiving process. In this way, only a relatively small quantity of radio-frequency link components are required to implement receiving and transmitting of the signals of the different frequency bands, which reduces a link size of a communications system.

Figure 9:
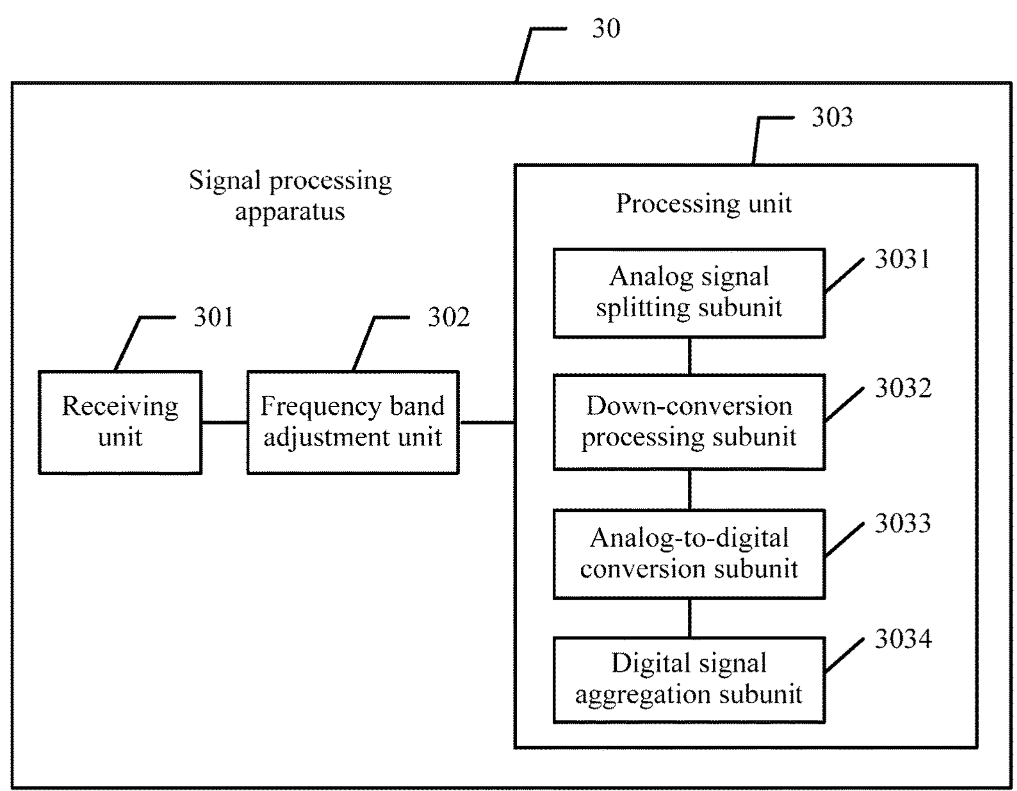
FIG. 9 is a schematic diagram of another embodiment of a signal processing apparatus according to the present application.

Optionally, on a basis of the foregoing embodiment corresponding to FIG. 8, referring to FIG. 9, in another embodiment of the signal processing apparatus 30 provided in the present application, the processing unit 303 includes:

an analog signal splitting subunit 3031, configured to split, according to a preconfigured policy, the analog signal that has been adjusted to the lowest frequency band, so that the analog signal that has been adjusted to the lowest frequency band forms at least two analog sub-signals;

a down-conversion processing subunit 3032, configured to perform down-conversion processing on the at least two analog sub-signals obtained by means of splitting by the analog signal splitting subunit 3031;

an analog-to-digital conversion subunit 3033, configured to perform analog-to-digital conversion on the at least two analog sub-signals obtained after the down-conversion processing subunit 3032 performs down-conversion, so as to form at least two digital sub-signals corresponding to the at least two analog sub-signals; and a digital signal aggregation subunit 3034, configured to aggregate, into one digital signal, the at least two digital sub-signals obtained after the analog-to-digital conversion subunit 3033 performs analog-to-digital conversion.

Figure 10:
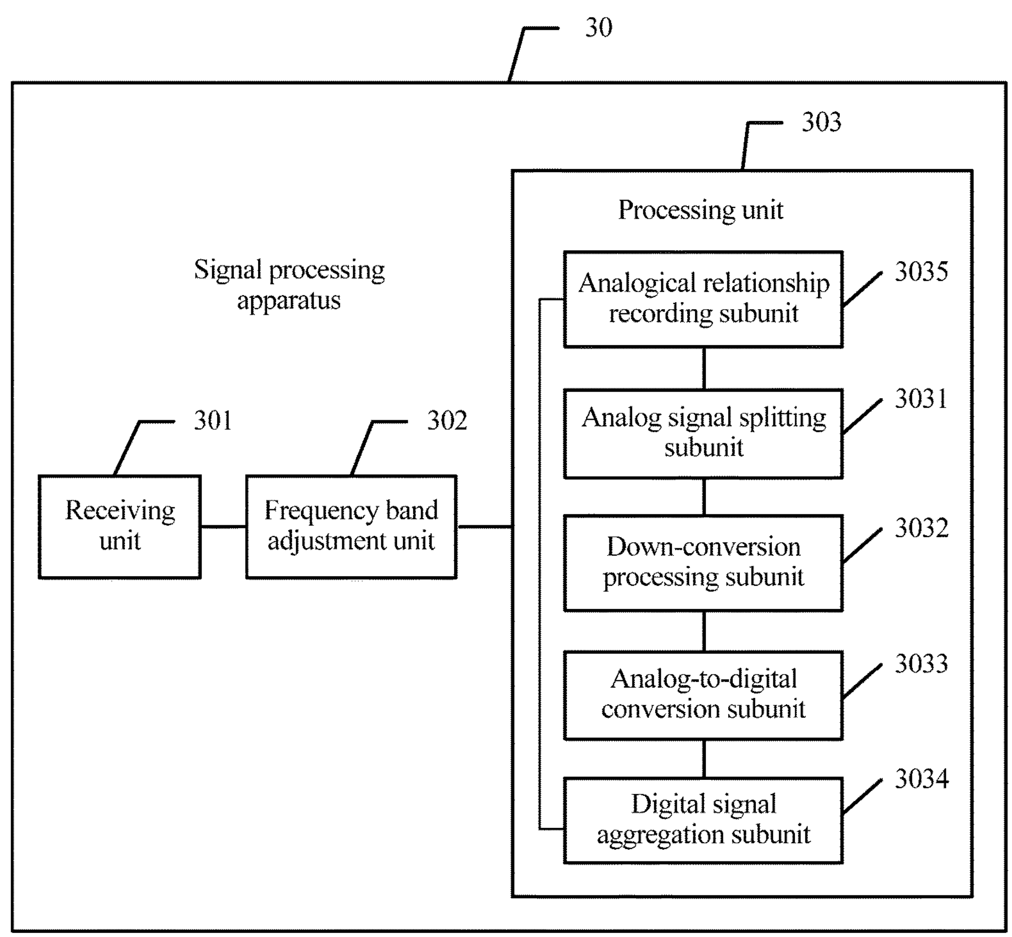
FIG. 10 is a schematic diagram of another embodiment of a signal processing apparatus according to the present application.

Optionally, on a basis of the foregoing embodiment corresponding to FIG. 9, referring to FIG. 10, in another embodiment of the signal processing apparatus 30 provided in this embodiment of the present application, the processing unit 303 further includes: an analog relationship recording subunit 3035, where:

the analog relationship recording subunit 3035 is configured to record an association between the analog signal that has been adjusted to the lowest frequency band and the at least two analog sub-signals; and the digital signal aggregation subunit 3034 is configured to aggregate the at least two digital sub-signals into the one digital signal according to the association, recorded by the analog relationship recording subunit 3035, between the analog signal that has been adjusted to the lowest frequency band and the at least two analog sub-signals.

Optionally, on a basis of the foregoing embodiment corresponding to FIG. 9 or FIG. 10, in another embodiment of the signal processing apparatus 30 provided in this embodiment of the present application, the analog signal splitting subunit 3031 is configured to determine, according to a sampling rate of an analog-to-digital converter, a quantity of sub-signals into which the analog signal is to be split, and split the analog signal into analog sub-signals of the quantity of sub-signals by using a power splitting/combining network.

Figure 11:
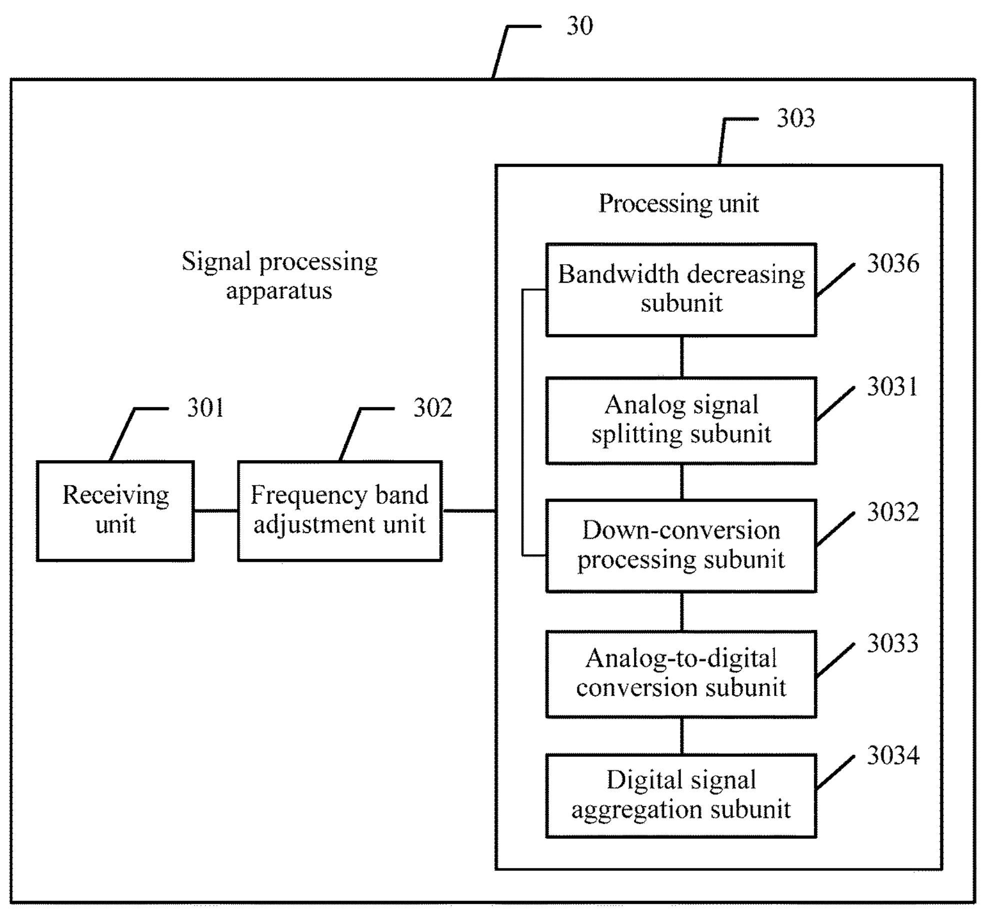
FIG. 11 is a schematic diagram of another embodiment of a signal processing apparatus according to the present application.

Optionally, on a basis of the foregoing FIG. 9 or FIG. 10 a corresponding embodiment, referring to FIG. 11, in another embodiment of the signal processing apparatus 30 provided in this embodiment of the present application, the processing unit 303 further includes:

a bandwidth decreasing subunit 3036, configured to: before the down-conversion processing subunit 3032 performs down-conversion processing on the at least two analog sub-signals, decrease bandwidths of the at least two analog sub-signals, so that bandwidths, obtained after the decrement, of the at least two analog sub-signals are less than or equal to the sampling rate that is of the analog-to-digital converter and is corresponding to the analog sub-signals, and a sum of the bandwidths, obtained after the decrement, of the at least two analog sub-signals remains unchanged.

Optionally, on a basis of the foregoing FIG. 11, in another embodiment of the signal processing apparatus 30 provided in this embodiment of the present application, the down-conversion processing subunit 3032 is configured to generate a corresponding local-frequency signal according to frequency bands in which the at least two analog sub-signals are located after the bandwidths of the at least two analog sub-signals are decreased by the bandwidth decreasing subunit 3036, and perform, by using the corresponding local-frequency signal, down-conversion processing on the at least two analog sub-signals whose bandwidths have been decreased, to obtain the at least two analog sub-signals obtained after the down-conversion.

Optionally, on a basis of the foregoing FIG. 8, in another embodiment of the signal processing apparatus 30 provided in this embodiment of the present application, the frequency band adjustment unit 302 is configured to input the analog signal into a corresponding adjustment channel according to the frequency band of the analog signal, and adjust the analog signal to the lowest frequency band in a manner of performing down-conversion for N times, where N is greater than or equal to 0.

The frequency band adjustment unit 302 is configured to: when N is equal to 0, which indicates that the analog signal has already been located in the lowest frequency band, perform only filtering and low-noise amplification on the analog signal; when N is equal to 1, successively perform filtering, low-noise amplification, and down-conversion on the analog signal, and adjust the analog signal to the lowest frequency band; or when N is greater than 1, perform filtering on the analog signal obtained after the former down-conversion, then perform the latter down-conversion, and adjust the analog signal to the lowest frequency band.

In the prior art, receiving and processing are performed separately by using an independent antenna and an independent radio-frequency link in multiple different frequency bands. By contrast, the signal processing apparatus provided in this embodiment of the present application processes signals of different frequency bands by using a processing channel in a lowest frequency band in a receiving process. In this way, only a relatively small quantity of radio-frequency link components are required to implement receiving and processing of the signals of the different frequency bands, which reduces a link size of a communications system.

On the other hand, in this embodiment of the present application, when the signals of the different frequency bands are processed by using the processing channel in the lowest frequency band, a large-bandwidth signal may be split according to a sampling rate of an analog-to-digital converter, so that only an analog-to-digital converter of a low sampling rate is required to implement analog-to-digital conversion processing on the signal, and there is no need to specially manufacture an analog-to-digital converter of a high sampling rate. In this way, a difficulty in constructing a communications system is further reduced.

A signal receiving process of the signal processing apparatus provided in this embodiment of the present application may be understood with reference to the descriptions shown in FIG. 1 to FIG. 8, and details are not described herein.

Figure 12:
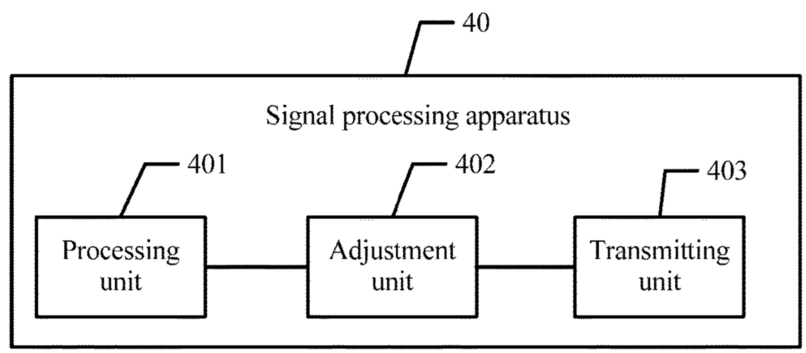
FIG. 12 is a schematic diagram of another embodiment of a signal processing apparatus according to the present application.

Referring to FIG. 12, an embodiment of a signal processing apparatus 40 provided in an embodiment of the present application includes:

a processing unit 401, configured to process a to-be-transmitted digital signal by using a signal processing channel in a lowest frequency band in multiple preconfigured frequency bands, to form an analog signal;

an adjustment unit 402, configured to, when a frequency band of the analog signal obtained by the processing unit 401 falls outside a preconfigured transmit frequency band of the digital signal, adjust the analog signal to the preconfigured transmit frequency band; and a transmitting unit 403, configured to transmit, in the preconfigured transmit frequency band, the analog signal adjusted by the adjustment unit 402.

In this embodiment of the present application, a processing unit 401 processes a to-be-transmitted digital signal by using a signal processing channel in a lowest frequency band in multiple preconfigured frequency bands, to form an analog signal; an adjustment unit 402 adjusts, when a frequency band of the analog signal obtained by the processing unit 401 falls outside a preconfigured transmit frequency band of the digital signal, the analog signal to the preconfigured transmit frequency band; and a transmitting unit 403 transmits, in the preconfigured transmit frequency band, the analog signal adjusted by the adjustment unit 402. In the prior art, processing and transmitting are performed separately by using an independent antenna and an independent radio-frequency link in multiple different frequency bands. By contrast, the signal processing apparatus provided in this embodiment of the present application processes signals of different frequency bands by using a processing channel in a lowest frequency band in a signal transmitting process. In this way, only a relatively small quantity of radio-frequency link components are required to implement processing and transmitting of the signals of the different frequency bands, which reduces a link size of a communications system.

Figure 13:
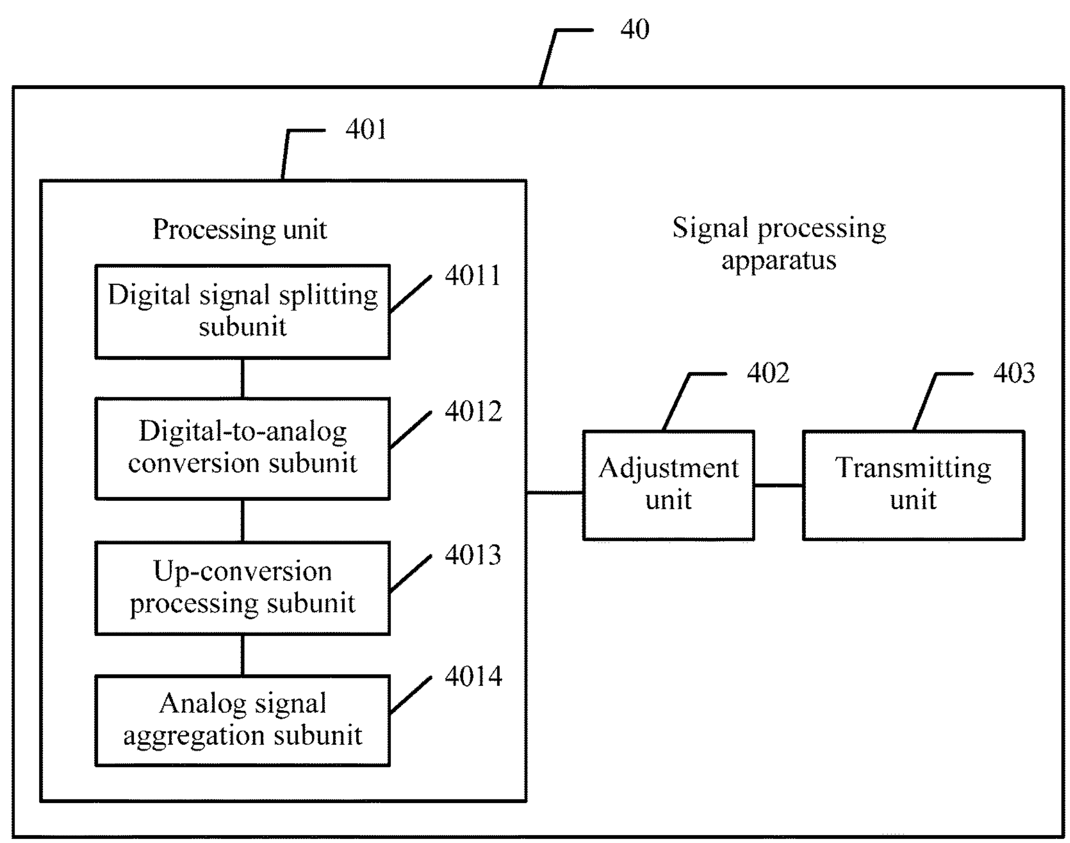
FIG. 13 is a schematic diagram of another embodiment of a signal processing apparatus according to the present application.

Optionally, on a basis of the foregoing embodiment corresponding to FIG. 12, referring to FIG. 13, in another embodiment of the signal processing apparatus 40 provided in this embodiment of the present application, the processing unit 401 includes:

a digital signal splitting subunit 4011, configured to split the to-be-transmitted digital signal according to a preconfigured policy, so that the digital signal forms at least two digital sub-signals;

a digital-to-analog conversion subunit 4012, configured to perform digital-to-analog conversion on the at least two digital sub-signals obtained by means of splitting by the digital signal splitting subunit 4011, to correspondingly form at least two analog sub-signals;

an up-conversion processing subunit 4013, configured to perform up-conversion processing on the at least two analog sub-signals obtained after the digital-to-analog conversion subunit 4012 performs digital-to-analog conversion; and an analog signal aggregation subunit 4014, configured to aggregate, into the analog signal, the at least two analog sub-signals obtained after the up-conversion processing subunit 4013 performs up-conversion.

Figure 14:
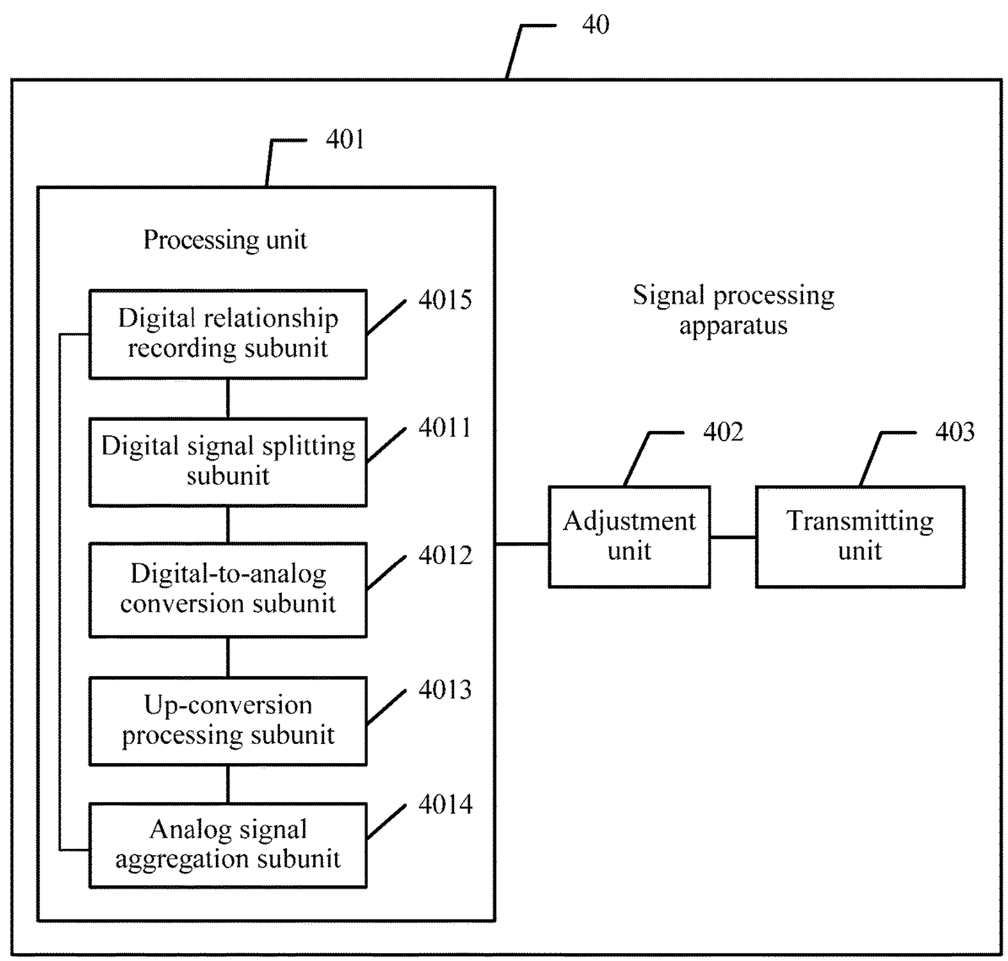
FIG. 14 is a schematic diagram of another embodiment of a signal processing apparatus according to the present application.

Optionally, on a basis of the foregoing embodiment corresponding to FIG. 13, referring to FIG. 14, in another embodiment of the signal processing apparatus 40 provided in this embodiment of the present application, the processing unit 401 further includes: a digital relationship recording subunit 4015, where:

the digital relationship recording subunit 4015 is configured to record an association between the digital signal and the at least two digital sub-signals obtained after the digital signal splitting subunit 4011 splits the digital signal; and the analog signal aggregation subunit 4014 is configured to aggregate the at least two analog sub-signals obtained after the up-conversion into the analog signal by using a power splitting/combining network according to the association, recorded by the digital relationship recording subunit 4015, between the digital signal and the at least two digital sub-signals.

Optionally, on a basis of the foregoing embodiment corresponding to FIG. 13 or FIG. 14, in another embodiment of the signal processing apparatus 40 provided in this embodiment of the present application, the digital signal splitting subunit 4011 is configured to determine, according to a sampling rate of an analog-to-digital converter, a quantity of sub-signals into which the digital signal is to be split, and split the digital signal into digital sub-signals of the quantity of sub-signals.

Optionally, on a basis of the foregoing embodiment corresponding to FIG. 13 or FIG. 14, in another embodiment of the signal processing apparatus 40 provided in this embodiment of the present application, the up-conversion processing subunit 4013 is configured to determine, according to the preconfigured transmit frequency band, to-be-up-converted sub-bands corresponding to the at least two analog sub-signals, generate corresponding local-frequency signals according to the to-be-up-converted sub-bands corresponding to the at least two analog sub-signals, and perform up-conversion processing on the at least two analog sub-signals by using the corresponding local-frequency signals, so that the at least two analog sub-signals are up-converted to the corresponding up-conversion sub-bands, to obtain the at least two analog sub-signals obtained after the up-conversion.

Figure 15:
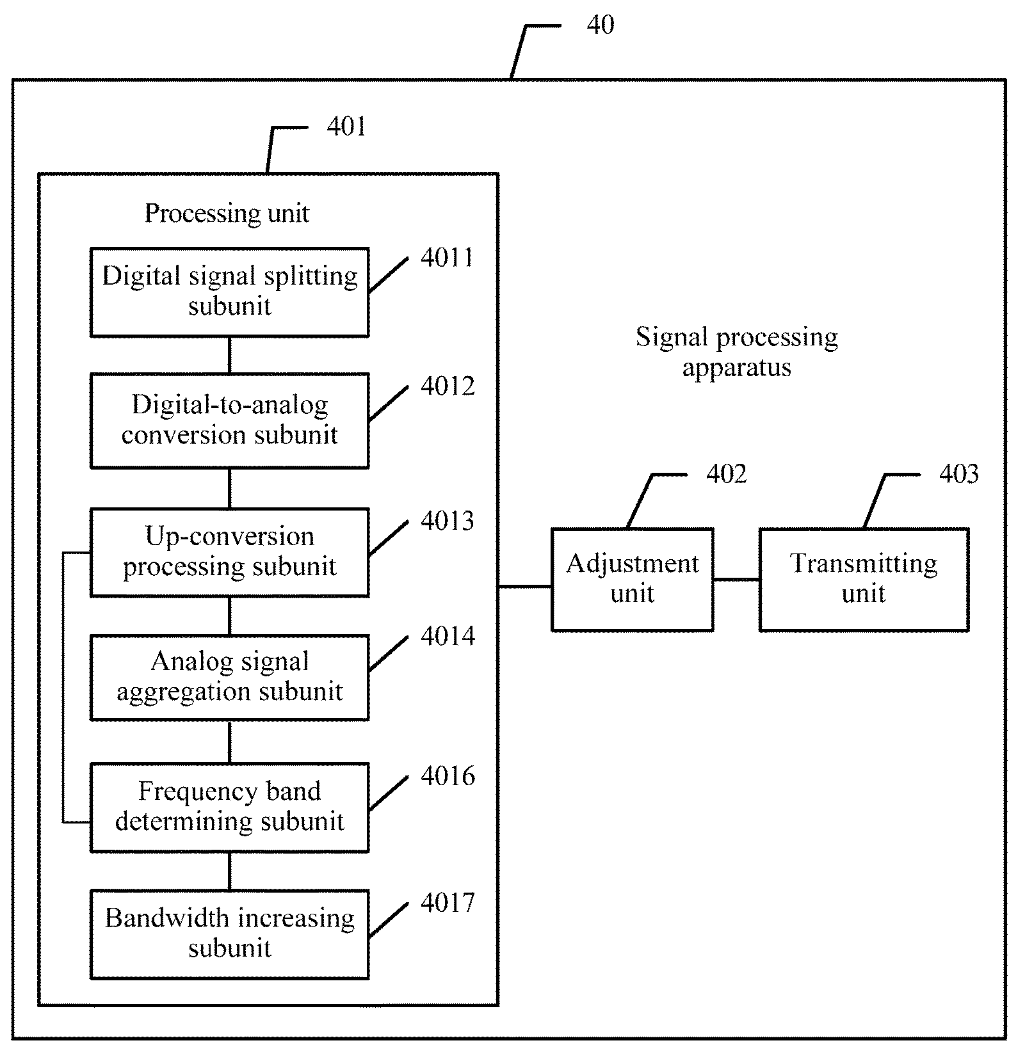
FIG. 15 is a schematic diagram of another embodiment of a signal processing apparatus according to the present application.

Optionally, on a basis of the foregoing optional embodiment corresponding to FIG. 13, referring to FIG. 15, in another embodiment of the signal processing apparatus 40 provided in this embodiment of the present application, the processing unit 401 further includes:

a frequency band determining subunit 4016, configured to determine, according to the to-be-up-converted sub-bands that are corresponding to the at least two analog sub-signals and are determined by the up-conversion processing subunit 4013, a to-be-up-converted frequency band corresponding to the digital signal; and a bandwidth increasing subunit 4017, configured to increase bandwidths of the at least two analog sub-signals obtained after the up-conversion processing subunit 4013 performs up-conversion processing, so that frequency bands of the at least two analog sub-signals whose bandwidths are increased are restored to the to-be-up-converted frequency band that is corresponding to the digital signal and is determined by the frequency band determining subunit 4016.

Optionally, on a basis of the foregoing embodiment, in another embodiment of the signal processing apparatus 40 provided in this embodiment of the present application, the adjustment unit 402 is configured to input the analog signal into a corresponding adjustment channel according to the preconfigured transmit frequency band, and adjust the analog signal to the preconfigured transmit frequency band in a manner of performing up-conversion for N times, where N is greater than or equal to 0.

The adjustment unit 402 is configured to: when N is equal to 0, which indicates that the analog signal has already been located in the preconfigured transmit frequency band, perform only direct amplification on the analog signal; or when N is greater than or equal to 1, perform filtering on the analog signal obtained after up-conversion is performed each time, amplify the analog signal obtained after last-time filtering, and adjust the analog signal to the preconfigured transmit frequency band.

In the prior art, processing and transmitting are performed separately by using an independent antenna and an independent radio-frequency link in multiple different frequency bands. By contrast, the signal processing apparatus provided in this embodiment of the present application processes signals of different frequency bands by using a processing channel in a lowest frequency band in a signal transmitting process. In this way, only a relatively small quantity of radio-frequency link components are required to implement processing and transmitting of the signals of the different frequency bands, which reduces a link size of a communications system.

On the other hand, in this embodiment of the present application, when the signals of the different frequency bands are processed by using the processing channel in the lowest frequency band, a large-bandwidth signal may be split according to a sampling rate of a digital-to-analog converter, so that only a digital-to-analog converter of a low sampling rate is required to implement digital-to-analog conversion processing on the signal, and there is no need to specially manufacture a digital-to-analog converter of a high sampling rate. In this way, a difficulty in constructing a communications system is further reduced.

A signal transmitting process of the signal processing apparatus provided in this embodiment of the present application may be understood with reference to the descriptions shown in FIG. 1 to FIG. 8, and details are not described herein.

Figure 16:
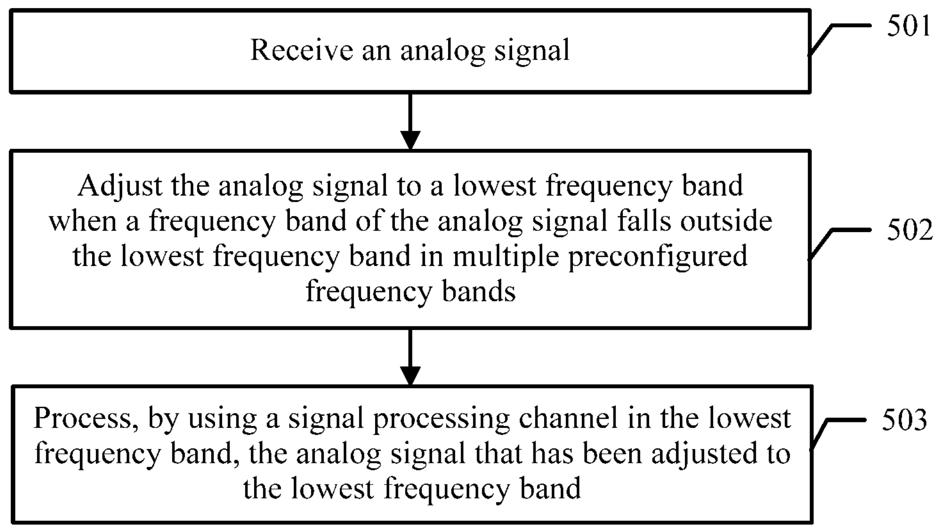
FIG. 16 is a schematic diagram of an embodiment of a signal processing method according to the present application.

Referring to FIG. 16, from a perspective of receiving a signal, an embodiment of a signal processing method provided in an embodiment of the present application includes the following steps:

501. Receive an analog signal.

502. Adjust the analog signal to a lowest frequency band when a frequency band of the analog signal falls outside the lowest frequency band in multiple preconfigured frequency bands.

503. Process, by using a signal processing channel in the lowest frequency band, the analog signal that has been adjusted to the lowest frequency band.

In this embodiment of the present application, an analog signal is received, the analog signal is adjusted to a lowest frequency band when a frequency band of the analog signal falls outside the lowest frequency band in multiple preconfigured frequency bands, and the analog signal that has been adjusted to the lowest frequency band is processed by using a signal processing channel in the lowest frequency band. In the prior art, receiving and processing are performed separately by using an independent antenna and an independent radio-frequency link in multiple different frequency bands. By contrast, according to the signal processing method provided in this embodiment of the present application, signals of different frequency bands are processed by using a processing channel in a lowest frequency band in a signal receiving process. In this way, only a relatively small quantity of radio-frequency link components are required to implement receiving and processing of the signals of the different frequency bands, which reduces a link size of a communications system.

Optionally, on a basis of the foregoing embodiment corresponding to FIG. 16, in another embodiment of the signal processing method provided in this embodiment of the present application, the processing, by using a signal processing channel in the lowest frequency band, the analog signal that has been adjusted to the lowest frequency band may include:

splitting, according to a preconfigured policy, the analog signal that has been adjusted to the lowest frequency band, so that the analog signal that has been adjusted to the lowest frequency band forms at least two analog sub-signals;

performing down-conversion processing on the at least two analog sub-signals;

performing analog-to-digital conversion on the at least two analog sub-signals obtained after the down-conversion, so as to form at least two digital sub-signals corresponding to the at least two analog sub-signals; and aggregating the at least two digital sub-signals into one digital signal.

Optionally, on a basis of the foregoing optional embodiment corresponding to FIG. 16, in another embodiment of the signal processing method provided in this embodiment of the present application, when the analog signal that has been adjusted to the lowest frequency band is split according to the preconfigured policy, the method may further include:

recording an association between the analog signal that has been adjusted to the lowest frequency band and the at least two analog sub-signals; and the aggregating the at least two digital sub-signals into one digital signal may include:

aggregating the at least two digital sub-signals into the one digital signal according to the association between the analog signal that has been adjusted to the lowest frequency band and the at least two analog sub-signals.

Optionally, on a basis of the foregoing optional embodiment corresponding to FIG. 16, in another embodiment of the signal processing method provided in this embodiment of the present application, the splitting, according to a preconfigured policy, the analog signal that has been adjusted to the lowest frequency band may include:

determining, according to a sampling rate of an analog-to-digital converter, a quantity of sub-signals into which the analog signal is to be split; and splitting the analog signal into analog sub-signals of the quantity of sub-signals by using a power splitting/combining network.

Optionally, on a basis of the foregoing optional embodiment corresponding to FIG. 16, in another embodiment of the signal processing method provided in this embodiment of the present application, before the performing down-conversion processing on the at least two analog sub-signals, the method may further include:

decreasing bandwidths of the at least two analog sub-signals, so that bandwidths, obtained after the decrement, of the at least two analog sub-signals are less than or equal to the sampling rate that is of the analog-to-digital converter and is corresponding to the analog sub-signals, and a sum of the bandwidths, obtained after the decrement, of the at least two analog sub-signals remains unchanged.

Optionally, on a basis of the foregoing optional embodiment corresponding to FIG. 16, in another embodiment of the signal processing method provided in this embodiment of the present application, the performing down-conversion processing on the at least two analog sub-signals may include:

generating a corresponding local-frequency signal according to frequency bands in which the at least two analog sub-signals are located after the bandwidths of the at least two analog sub-signals are decreased; and performing, by using the corresponding local-frequency signal, down-conversion processing on the at least two analog sub-signals whose bandwidths have been decreased, to obtain the at least two analog sub-signals obtained after the down-conversion.

Optionally, on a basis of the foregoing optional embodiment corresponding to FIG. 16, in another embodiment of the signal processing method provided in this embodiment of the present application, the adjusting the analog signal to a lowest frequency band when a frequency band of the analog signal falls outside the lowest frequency band in multiple preconfigured frequency bands may include:

inputting the analog signal into a corresponding adjustment channel according to the frequency band of the analog signal; and adjusting the analog signal to the lowest frequency band in a manner of performing down-conversion for N times, where N is greater than or equal to 0.

Optionally, on a basis of the foregoing optional embodiment corresponding to FIG. 16, in another embodiment of the signal processing method provided in this embodiment of the present application, when N is equal to 0, the adjusting the analog signal to the lowest frequency band may include:

when N is equal to 0, which indicates that the analog signal has already been located in the lowest frequency band, performing only filtering and low-noise amplification on the analog signal; or when N is greater than or equal to 1, the adjusting the analog signal to the lowest frequency band may include:

when N is equal to 1, successively performing filtering, low-noise amplification, and down-conversion on the analog signal, and adjusting the analog signal to the lowest frequency band; or when N is greater than 1, performing filtering on the analog signal obtained after the former down-conversion, then performing the latter down-conversion, and adjusting the analog signal to the lowest frequency band.

In this embodiment of the present application, when signals of different frequency bands are processed by using a processing channel in a lowest frequency band, a large-bandwidth signal may be split according to a sampling rate of an analog-to-digital converter, so that only an analog-to-digital converter of a low sampling rate is required to implement analog-to-digital conversion processing on the signal, and there is no need to specially manufacture an analog-to-digital converter of a high sampling rate. In this way, a difficulty in constructing a communications system is further reduced.

A signal receiving process in the signal processing method provided in this embodiment of the present application may be understood with reference to the descriptions shown in FIG. 1 to FIG. 8, and details are not described herein.

Figure 17:
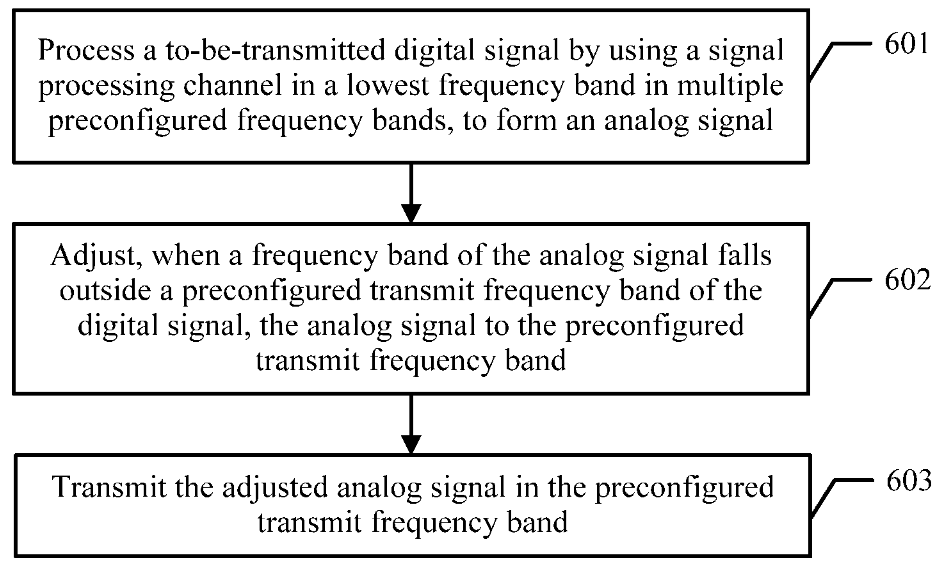
FIG. 17 is a schematic diagram of another embodiment of a signal processing method according to the present application.

Referring to FIG. 17, another embodiment of a signal processing method provided in an embodiment of the present application includes the following steps:

601. Process a to-be-transmitted digital signal by using a signal processing channel in a lowest frequency band in multiple preconfigured frequency bands, to form an analog signal.

602. Adjust, when a frequency band of the analog signal falls outside a preconfigured transmit frequency band of the digital signal, the analog signal to the preconfigured transmit frequency band.

603. Transmit the adjusted analog signal in the preconfigured transmit frequency band.

In this embodiment of the present application, a to-be-transmitted digital signal is processed by using a signal processing channel in a lowest frequency band in multiple preconfigured frequency bands, to form an analog signal, when a frequency band of the analog signal falls outside a preconfigured transmit frequency band of the digital signal, the analog signal is adjusted to the preconfigured transmit frequency band, and the adjusted analog signal is transmitted in the preconfigured transmit frequency band. In the prior art, processing and transmitting are performed separately by using an independent antenna and an independent radio-frequency link in multiple different frequency bands. By contrast, according to the signal processing method provided in this embodiment of the present application, signals of different frequency bands are processed by using a processing channel in a lowest frequency band in a signal transmitting process. In this way, only a relatively small quantity of radio-frequency link components are required to implement processing and transmitting of the signals of the different frequency bands, which reduces a link size of a communications system.

Optionally, on a basis of the foregoing embodiment corresponding to FIG. 17, in another embodiment of the signal processing method provided in this embodiment of the present application, the processing a to-be-transmitted digital signal by using a signal processing channel in a lowest frequency band in multiple preconfigured frequency bands, to form an analog signal may include:

splitting the to-be-transmitted digital signal according to a preconfigured policy, so that the digital signal forms at least two digital sub-signals;

performing digital-to-analog conversion on the at least two digital sub-signals, to correspondingly form at least two analog sub-signals;

performing up-conversion processing on the at least two analog sub-signals; and aggregating, into the analog signal, the at least two analog sub-signals obtained after the up-conversion.

Optionally, on a basis of the foregoing optional embodiment corresponding to FIG. 17, in another embodiment of the signal processing method provided in this embodiment of the present application, when the to-be-transmitted digital signal is split according to the preconfigured policy, the method may further include:

recording an association between the digital signal and the at least two digital sub-signals obtained after the digital signal is split; and the aggregating, into the analog signal, the at least two analog sub-signals obtained after the up-conversion includes:

aggregating the at least two analog sub-signals obtained after the up-conversion into the analog signal by using a power splitting/combining network according to the association between the digital signal and the at least two digital sub-signals.

Optionally, on a basis of the foregoing optional embodiment corresponding to FIG. 17, in another embodiment of the signal processing method provided in this embodiment of the present application, the splitting the to-be-transmitted digital signal according to a preconfigured policy may include:

determining, according to a sampling rate of an analog-to-digital converter, a quantity of sub-signals into which the digital signal is to be split; and splitting the digital signal into digital sub-signals of the quantity of sub-signals.

Optionally, on a basis of the foregoing optional embodiment corresponding to FIG. 17, in another embodiment of the signal processing method provided in this embodiment of the present application, the performing up-conversion processing on the at least two analog sub-signals may include:

determining, according to the preconfigured transmit frequency band, to-be-up-converted sub-bands corresponding to the at least two analog sub-signals;

generating corresponding local-frequency signals according to the to-be-up-converted sub-bands corresponding to the at least two analog sub-signals; and performing up-conversion processing on the at least two analog sub-signals by using the corresponding local-frequency signals, so that the at least two analog sub-signals are up-converted to the corresponding up-conversion sub-bands, to obtain the at least two analog sub-signals obtained after the up-conversion.

Optionally, on a basis of the foregoing optional embodiment corresponding to FIG. 17, in another embodiment of the signal processing method provided in this embodiment of the present application, after the performing up-conversion processing on the at least two analog sub-signals, the method may further include:

determining, according to the to-be-up-converted sub-bands corresponding to the at least two analog sub-signals, a to-be-up-converted frequency band corresponding to the digital signal; and increasing bandwidths of the at least two analog sub-signals obtained after the up-conversion processing, so that frequency bands of the at least two analog sub-signals whose bandwidths are increased are restored to the to-be-up-converted frequency band corresponding to the digital signal.

Optionally, on a basis of the foregoing optional embodiment corresponding to FIG. 17, in another embodiment of the signal processing method provided in this embodiment of the present application, the adjusting, when a frequency band of the analog signal falls outside a preconfigured transmit frequency band of the digital signal, the analog signal to the preconfigured transmit frequency band may include:

inputting the analog signal into a corresponding adjustment channel according to the preconfigured transmit frequency band; and adjusting the analog signal to the preconfigured transmit frequency band in a manner of performing up-conversion for N times, where N is greater than or equal to 0.

Optionally, on a basis of the foregoing optional embodiment corresponding to FIG. 17, in another embodiment of the signal processing method provided in this embodiment of the present application, when N is equal to 0, the adjusting the analog signal to the preconfigured transmit frequency band includes:

when N is equal to 0, which indicates that the analog signal has already been located in the preconfigured transmit frequency band, performing only direct amplification on the analog signal; or when N is greater than or equal to 1, performing filtering on the analog signal obtained after up-conversion is performed each time, amplifying the analog signal obtained after last-time filtering, and adjusting the analog signal to the preconfigured transmit frequency band.

In this embodiment of the present application, when signals of different frequency bands are processed by using a processing channel in a lowest frequency band, a large-bandwidth signal may be split according to a sampling rate of a digital-to-analog converter, so that only a digital-to-analog converter of a low sampling rate is required to implement digital-to-analog conversion processing on the signal, and there is no need to specially manufacture a digital-to-analog converter of a high sampling rate. In this way, a difficulty in constructing a communications system is further reduced.

A signal transmitting process in the signal processing method provided in this embodiment of the present application may be understood with reference to the descriptions shown in FIG. 1 to FIG. 8, and details are not described herein.

Figure 18:
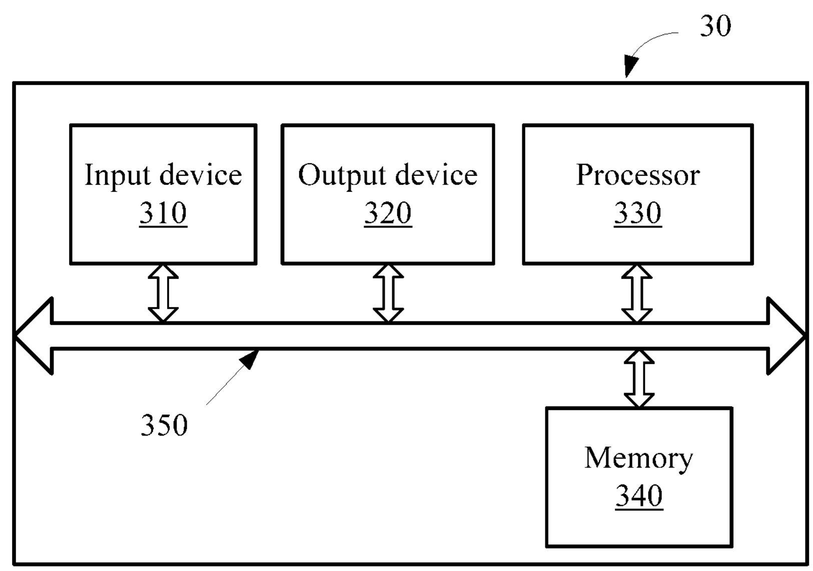
FIG. 18 is a schematic diagram of another embodiment of a signal processing apparatus according to the present application.

FIG. 18 is a schematic structural diagram of a signal processing apparatus 30 according to an embodiment of the present application. The signal processing apparatus 30 may include an input device 310, an output device 320, a processor 330, and a memory 340.

The memory 340 may include a read-only memory and a random access memory, and provides an instruction and data for the processor 330. the memory 340 may further include a non-volatile random access memory (NVRAM).

The memory 340 stores the following elements: an executable module or a data structure, or a subset of an executable module or a data structure, or an extension set of an executable module or a data structure.

Operating instructions include various operating instructions, which are used to implement various operations.

An operating system includes various system programs, which are used to implement various basic services and process hardware-based tasks.

In this embodiment of the present application, the processor 330 invokes an operating instruction stored in the memory 340 (the operating instruction may be stored in the operating system), so as to execute the following operations:

receiving an analog signal by using the input device 310;

adjusting the analog signal to a lowest frequency band when a frequency band of the analog signal falls outside the lowest frequency band in multiple preconfigured frequency bands; and processing, by using a signal processing channel in the lowest frequency band, the analog signal that has been adjusted to the lowest frequency band.

In this embodiment of the present application, the signal processing apparatus 30 may process signals of different frequency bands by using a processing channel in a lowest frequency band in a signal receiving process. In this way, only a relatively small quantity of radio-frequency link components are required to implement receiving and transmitting of the signals of the different frequency bands, which reduces a link size of a communications system.

The processor 330 controls operations of the signal processing apparatus 30, and the processor 330 may also be referred to as a CPU (central processing unit). The memory 340 may include a read-only memory and a random access memory, and provides an instruction and data for the processor 330. A part of the memory 340 may further include a non-volatile random access memory (NVRAM). In a specific application, all components of the signal processing apparatus 30 are coupled together by using a bus system 350, where the bus system 350 may further include a power supply bus, a control bus, a status signal bus, and the like in addition to a data bus. However, for clear description, various types of buses are marked as the bus system 350 in the figure.

The methods disclosed in the foregoing embodiments of the present application may be applied to the processor 330, or implemented by the processor 330. The processor 330 may be an integrated circuit chip and has a signal processing capability. In an implementation process, the steps in the foregoing methods may be completed by means of an integrated logic circuit of hardware in the processor 330 or an instruction in a form of software. The foregoing processor 330 may be a general purpose processor, a digital signal processor (DSP), an application-specific integrated circuit (ASIC), a field programmable gate array (FPGA), or another programmable logic device, discrete gate or transistor logic device, or discrete hardware component, and may implement or execute methods, steps and logical block diagrams disclosed in the embodiments of the present application. The general purpose processor may be a microprocessor or the processor may be any conventional processor or the like. Steps of the methods disclosed with reference to the embodiments of the present application may be directly executed and completed by means of a hardware decoding processor, or may be executed and completed by using a combination of hardware and software modules in a decoding processor. The software module may be located in a mature storage medium in the field, such as a random access memory, a flash memory, a read-only memory, a programmable read-only memory, an electrically-erasable programmable memory, or a register. The storage medium is located in the memory 340, and the processor 330 reads information in the memory 340 and completes the steps in the foregoing methods in combination with hardware of the processor 330.

Optionally, the processor 330 may specifically split, according to a preconfigured policy, the analog signal that has been adjusted to the lowest frequency band, so that the analog signal that has been adjusted to the lowest frequency band forms at least two analog sub-signals; perform down-conversion processing on the at least two analog sub-signals; perform analog-to-digital conversion on the at least two analog sub-signals obtained after the down-conversion, so as to form at least two digital sub-signals corresponding to the at least two analog sub-signals; and aggregate the at least two digital sub-signals into one digital signal.

Optionally, when the analog signal that has been adjusted to the lowest frequency band is split according to the preconfigured policy, the processor 330 may specifically record an association between the analog signal that has been adjusted to the lowest frequency band and the at least two analog sub-signals; and aggregate the at least two digital sub-signals into the one digital signal according to the association between the analog signal that has been adjusted to the lowest frequency band and the at least two analog sub-signals.

Optionally, the processor 330 may specifically determine, according to a sampling rate of an analog-to-digital converter, a quantity of sub-signals into which the analog signal is to be split, and split the analog signal into analog sub-signals of the quantity of sub-signals by using a power splitting/combining network.

Optionally, the processor 330 may specifically decrease bandwidths of the at least two analog sub-signals, so that bandwidths, obtained after the decrement, of the at least two analog sub-signals are less than or equal to the sampling rate that is of the analog-to-digital converter and is corresponding to the analog sub-signals, and a sum of the bandwidths, obtained after the decrement, of the at least two analog sub-signals remains unchanged.

Optionally, the processor 330 may specifically generate a corresponding local-frequency signal according to frequency bands in which the at least two analog sub-signals are located after the bandwidths of the at least two analog sub-signals are decreased; and perform, by using the corresponding local-frequency signal, down-conversion processing on the at least two analog sub-signals whose bandwidths have been decreased, to obtain the at least two analog sub-signals obtained after the down-conversion.

Optionally, the processor 330 may specifically input the analog signal into a corresponding adjustment channel according to the frequency band of the analog signal, and adjust the analog signal to the lowest frequency band in a manner of performing down-conversion for N times, where N is greater than or equal to 0.

Optionally, the processor 330 may specifically: when N is equal to 0, which indicates that the analog signal has already been located in the lowest frequency band, perform only filtering and low-noise amplification on the analog signal; when N is equal to 1, successively perform filtering, low-noise amplification, and down-conversion on the analog signal, and adjust the analog signal to the lowest frequency band; or when N is greater than 1, perform filtering on the analog signal obtained after the former down-conversion, then perform the latter down-conversion, and adjust the analog signal to the lowest frequency band.

In this embodiment of the present application, when signals of different frequency bands are processed by using a processing channel in a lowest frequency band, a large-bandwidth signal may be split according to a sampling rate of an analog-to-digital converter, so that only an analog-to-digital converter of a low sampling rate is required to implement analog-to-digital conversion processing on the signal, and there is no need to specially manufacture an analog-to-digital converter of a high sampling rate. In this way, a difficulty in constructing a communications system is further reduced.

A signal receiving process of the signal processing apparatus provided in this embodiment of the present application may be understood with reference to the descriptions shown in FIG. 1 to FIG. 8, and details are not described herein.

Figure 19:
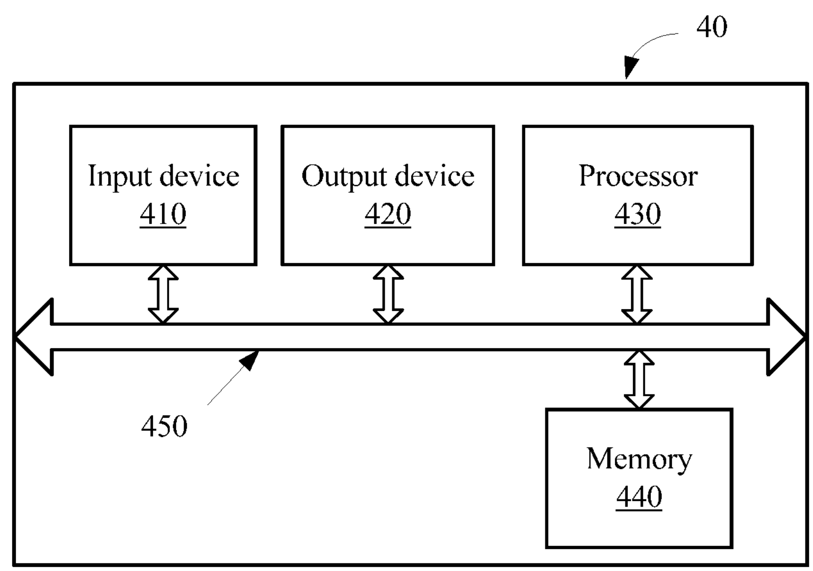
FIG. 19 is a schematic diagram of another embodiment of a signal processing apparatus according to the present application.

FIG. 19 is a schematic structural diagram of a signal processing apparatus 40 according to an embodiment of the present application. The signal processing apparatus 40 may include an input device 410, an output device 420, a processor 430, and a memory 440.

The memory 440 may include a read-only memory and a random access memory, and provides an instruction and data for the processor 430. A part of the memory 440 may further include a non-volatile random access memory (NVRAM).

The memory 440 stores the following elements: an executable module or a data structure, a subset of an executable module or a data structure, or an extension set of an executable module or a data structure.

Operating instructions include various operating instructions, which are used to implement various operations.

An operating system includes various system programs, which are used to implement various basic services and process hardware-based tasks.

In this embodiment of the present application, the processor 430 invokes an operating instruction stored in the memory 440 (the operating instruction may be stored in the operating system), so as to execute the following operations:

processing a to-be-transmitted digital signal by using a signal processing channel in a lowest frequency band in multiple preconfigured frequency bands, to form an analog signal;

adjusting, when a frequency band of the analog signal obtained by the processing unit falls outside a preconfigured transmit frequency band of the digital signal, the analog signal to the preconfigured transmit frequency band; and transmitting the adjusted analog signal in the preconfigured transmit frequency band by using the output device 420.

In this embodiment of the present application, the signal processing apparatus 40 may process signals of different frequency bands by using a processing channel in a lowest frequency band in a signal transmitting process. In this way, only a relatively small quantity of radio-frequency link components are required to implement receiving and transmitting of the signals of the different frequency bands, which reduces a link size of a communications system.

The processor 430 controls operations of the signal processing apparatus 40, and the processor 430 may also be referred to as a CPU (central processing unit). The memory 440 may include a read-only memory and a random access memory, and provides an instruction and data for the processor 430. A part of the memory 440 may further include a non-volatile random access memory (NVRAM). In a specific application, all components of the signal processing apparatus 40 are coupled together by using a bus system 450, where the bus system 450 may further include a power supply bus, a control bus, a status signal bus, and the like in addition to a data bus. However, for clear description, various types of buses are marked as the bus system 450 in the figure.

The methods disclosed in the foregoing embodiments of the present application may be applied to the processor 430, or implemented by the processor 430. The processor 430 may be an integrated circuit chip and has a signal processing capability. In an implementation process, the steps in the foregoing methods may be completed by means of an integrated logic circuit of hardware in the processor 430 or an instruction in a form of software. The foregoing processor 430 may be a general purpose processor, a digital signal processor (DSP), an application-specific integrated circuit (ASIC), a field programmable gate array (FPGA), or another programmable logic device, discrete gate or transistor logic device, or discrete hardware component, and may implement or execute methods, steps and logical block diagrams disclosed in the embodiments of the present application. The general purpose processor may be a microprocessor or the processor may be any conventional processor or the like. Steps of the methods disclosed with reference to the embodiments of the present application may be directly executed and completed by means of a hardware decoding processor, or may be executed and completed by using a combination of hardware and software modules in a decoding processor. The software module may be located in a mature storage medium in the field, such as a random access memory, a flash memory, a read-only memory, a programmable read-only memory, an electrically-erasable programmable memory, or a register. The storage medium is located in the memory 440, and the processor 430 reads information in the memory 440 and completes the steps in the foregoing methods in combination with hardware of the processor 430.

Optionally, the processor 430 may specifically split the to-be-transmitted digital signal according to a preconfigured policy, so that the digital signal forms at least two digital sub-signals; perform digital-to-analog conversion on the at least two digital sub-signals, to correspondingly form at least two analog sub-signals; perform up-conversion processing on the at least two analog sub-signals; and aggregate, into the analog signal, the at least two analog sub-signals obtained after the up-conversion.

Optionally, when the to-be-transmitted digital signal is split according to the preconfigured policy, the processor 430 may specifically record an association between the digital signal and the at least two digital sub-signals obtained after the digital signal is split; and aggregate the at least two analog sub-signals obtained after the up-conversion into the analog signal by using a power splitting/combining network according to the association between the digital signal and the at least two digital sub-signals.

Optionally, the processor 430 may specifically determine, according to a sampling rate of an analog-to-digital converter, a quantity of sub-signals into which the digital signal is to be split, and split the digital signal into digital sub-signals of the quantity of sub-signals.

Optionally, the processor 430 may specifically determine, according to the preconfigured transmit frequency band, to-be-up-converted sub-bands corresponding to the at least two analog sub-signals, generate corresponding local-frequency signals according to the to-be-up-converted sub-bands corresponding to the at least two analog sub-signals, and perform up-conversion processing on the at least two analog sub-signals by using the corresponding local-frequency signals, so that the at least two analog sub-signals are up-converted to the corresponding up-conversion sub-bands, to obtain the at least two analog sub-signals obtained after the up-conversion.

Optionally, the processor 430 may specifically determine, according to the to-be-up-converted sub-bands corresponding to the at least two analog sub-signals, a to-be-up-converted frequency band corresponding to the digital signal; and increase bandwidths of the at least two analog sub-signals obtained after the up-conversion processing, so that frequency bands of the at least two analog sub-signals whose bandwidths are increased are restored to the to-be-up-converted frequency band corresponding to the digital signal.

Optionally, the processor 430 may specifically input the analog signal into a corresponding adjustment channel according to the preconfigured transmit frequency band, and adjust the analog signal to the preconfigured transmit frequency band in a manner of performing up-conversion for N times, where N is greater than or equal to 0.

Optionally, the processor 430 may specifically: when N is equal to 0, which indicates that the analog signal has already been located in the preconfigured transmit frequency band, perform only direct amplification on the analog signal; or when N is greater than or equal to 1, perform filtering on the analog signal obtained after up-conversion is performed each time, amplify the analog signal obtained after last-time filtering, and adjust the analog signal to the preconfigured transmit frequency band.

In this embodiment of the present application, when signals of different frequency bands are processed by using a processing channel in a lowest frequency band, a large-bandwidth signal may be split according to a sampling rate of a digital-to-analog converter, so that only a digital-to-analog converter of a low sampling rate is required to implement digital-to-analog conversion processing on the signal, and there is no need to specially manufacture a digital-to-analog converter of a high sampling rate. In this way, a difficulty in constructing a communications system is further reduced.

A signal transmitting process of the signal processing apparatus provided in this embodiment of the present application may be understood with reference to the descriptions shown in FIG. 1 to FIG. 8, and details are not described herein.

Figure 20:
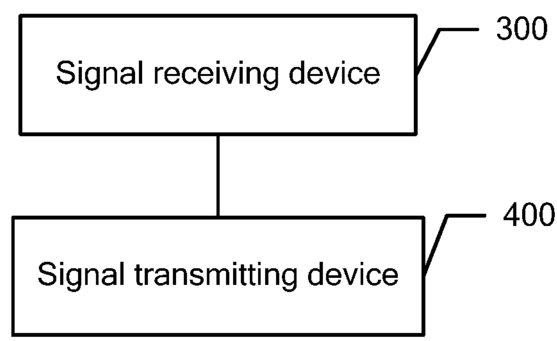
FIG. 20 is a schematic diagram of an embodiment of a signal transceiver system.

Referring to FIG. 20, an embodiment of a signal transceiver system provided in an embodiment of the present application includes a signal receiving device 300 and a signal transmitting device 400.

The signal receiving device 300 is configured to: receive an analog signal; adjust the analog signal to a lowest frequency band when a frequency band of the analog signal falls outside the lowest frequency band in multiple preconfigured frequency bands; and process, by using a signal processing channel in the lowest frequency band, the analog signal that has been adjusted to the lowest frequency band.

The signal transmitting device 400 is configured to: process a to-be-transmitted digital signal by using a signal processing channel in a lowest frequency band in multiple preconfigured frequency bands, to form an analog signal; adjust, when a frequency band of the analog signal falls outside a preconfigured transmit frequency band of the digital signal, the analog signal to the preconfigured transmit frequency band; and transmit the adjusted analog signal in the preconfigured transmit frequency band.

In the prior art, receiving, processing, and transmitting are performed separately by using an independent antenna and an independent radio-frequency link in multiple different frequency bands. By contrast, the signal transceiver system provided in this embodiment of the present application processes signals of different frequency bands by using a processing channel in a lowest frequency band either in a receiving process or a transmitting process. In this way, only a relatively small quantity of radio-frequency link components are required to implement receiving and transmitting of the signals of the different frequency bands, which reduces a link size of a communications system.

Persons of ordinary skill in the art may understand that all or some of the steps of the methods in the embodiments may be implemented by a program instructing relevant hardware. The program may be stored in a computer-readable storage medium. The storage medium may include: a ROM, a RAM, a magnetic disk, or an optical disc.

The foregoing gives detailed descriptions of the signal processing apparatus, method, and system provided in the embodiments of the present application. In this specification, specific examples are used to describe the principle and implementation manners of the present application, and the descriptions of the embodiments are only intended to help understand the method and core idea of the present application. Meanwhile, persons of ordinary skill in the art may, based on the idea of the present application, make modifications with respect to the specific implementation manners and the application scope. In conclusion, the content of this specification shall not be construed as a limitation to the present application.

What is claimed is:

1. A signal processing apparatus, comprising:

a memory to store instructions; and a processor to execute the instructions to cause the signal processing apparatus to:

receive an analog signal;

adjust the analog signal to a lowest frequency band when a frequency band of the analog signal received by the signal processing apparatus falls outside the lowest frequency band in multiple preconfigured frequency bands; and process, by using a signal processing channel in the lowest frequency band, the analog signal that has been adjusted to the lowest frequency band, comprising:

split, according to a preconfigured policy, the analog signal that has been adjusted to the lowest frequency band, so that the analog signal that has been adjusted to the lowest frequency band forms at least two analog sub-signals;

perform down-conversion processing on the at least two analog sub-signals obtained by the split;

perform analog-to-digital conversion on the at least two analog sub-signals obtained after the down-conversion, so as to form at least two digital sub-signals corresponding to the at least two analog sub-signals; and aggregate, into one digital signal, the at least two digital sub-signals obtained after the analog-to-digital conversion.

2. The apparatus according to claim 1, wherein the processor further executes the instructions to cause the signal processing apparatus to:

record an association between the analog signal that has been adjusted to the lowest frequency band and the at least two analog sub signals; and aggregate the at least two digital sub signals into the one digital signal according to the association recorded, between the analog signal that has been adjusted to the lowest frequency band and the at least two analog sub-signals.

3. The apparatus according to claim 1, wherein:

the processor further executes the instructions to cause the signal processing apparatus to:

determine, according to a sampling rate of an analog-to-digital converter, a quantity of sub-signals into which the analog signal is to be split, and split the analog signal into analog sub-signals of the quantity of sub-signals by using a power splitting/combining network.

4. The apparatus according to claim 1, wherein the processor further executes the instructions to cause the signal processing apparatus to: before the down-conversion processing on the at least two analog sub-signals, decrease bandwidths of the at least two analog sub-signals, so that bandwidths, obtained after the decrement, of the at least two analog sub-signals are less than or equal to the sampling rate that is of the analog-to-digital converter and is corresponding to the analog sub-signals, and a sum of the bandwidths, obtained after the decrement, of the at least two analog sub-signals remains unchanged.

5. The apparatus according to claim 4, wherein:

the processor further executes the instructions to cause the signal processing apparatus to:

generate a corresponding local frequency signal according to frequency bands in which the at least two analog sub-signals are located after the bandwidths of the at least two analog sub-signals; and perform, by using the corresponding local-frequency signal, down-conversion processing on the at least two analog sub-signals whose bandwidths have been decreased, to obtain the at least two analog sub-signals obtained after the down-conversion.

6. The apparatus according to claim 1, wherein:

the processor further executes the instructions to cause the signal processing apparatus to:

input the analog signal into a corresponding adjustment channel according to the frequency band of the analog signal, and adjust the analog signal to the lowest frequency band in a manner of performing down-conversion for N times, wherein N is greater than or equal to 0.

7. The apparatus according to claim 6, wherein:

the processor further executes the instructions to cause the signal processing apparatus to: when N is equal to 0, which indicates that the analog signal has already been located in the lowest frequency band, perform only filtering and low noise amplification on the analog signal; when N is equal to 1, successively perform filtering, low noise amplification, and down-conversion on the analog signal, and adjust the analog signal to the lowest frequency band; or when N is greater than 1, perform filtering on the analog signal obtained after the former down-conversion, then perform the latter down-conversion, and adjust the analog signal to the lowest frequency band.

8. A signal processing apparatus, comprising:

a memory to store instructions; and a processor to execute the instructions to cause the signal processing apparatus to:

process a to-be-transmitted digital signal by using a signal processing channel in a lowest frequency band in multiple preconfigured frequency bands, to form an analog signal;

when a frequency band of the analog signal obtained by the signal processing apparatus falls outside a preconfigured transmit frequency band of the digital signal, adjust the analog signal to the preconfigured transmit frequency band; and transmit, in the preconfigured transmit frequency band, the analog signal adjusted by the signal processing apparatus, comprising:

split the to-be-transmitted digital signal according to a preconfigured policy, so that the digital signal forms at least two digital sub-signals;

perform digital-to-analog conversion on the at least two digital sub-signals obtained by the split, to correspondingly form at least two analog sub-signals;

perform up-conversion processing on the at least two analog sub-signals obtained after the digital-to-analog conversion; and aggregate, into the analog signal, the at least two analog sub-signals obtained after the up-conversion.

9. The apparatus according to claim 8, wherein the processor further executes the instructions to cause the signal processing apparatus to:

record an association between the digital signal and the at least two digital sub-signals obtained after the split of the digital signal; and aggregate the at least two analog sub-signals obtained after the up-conversion into the analog signal by using a power splitting/combining network according to the association recorded, between the digital signal and the at least two digital sub-signals.

10. The apparatus according to claim 8, wherein:

the processor further executes the instructions to cause the signal processing apparatus to:

determine, according to a sampling rate of an analog-to-digital converter, a quantity of sub-signals into which the digital signal is to be split, and split the digital signal into digital sub-signals of the quantity of sub-signals.

11. The apparatus according to claim 10, wherein:

the processor further executes the instructions to cause the signal processing apparatus to:

determine, according to the preconfigured transmit frequency band, to-be-up-converted sub-bands corresponding to the at least two analog sub-signals, generate corresponding local-frequency signals according to the to-be-up-converted sub-bands corresponding to the at least two analog sub-signals, and perform up-conversion processing on the at least two analog sub-signals by using the corresponding local-frequency signals, so that the at least two analog sub-signals are up-converted to the corresponding up-conversion sub-bands, to obtain the at least two analog sub-signals obtained after the up-conversion.

12. The apparatus according to claim 11, wherein the processor further executes the instructions to cause the signal processing apparatus to:

determine, according to the to-be-up-converted sub-bands that are corresponding to the at least two analog sub-signals and are determined, a to-be-up-converted frequency band corresponding to the digital signal; and increase bandwidths of the at least two analog sub-signals obtained after the up-conversion processing, so that frequency bands of the at least two analog sub-signals whose bandwidths are increased are restored to the to-be-up-converted frequency band that is corresponding to the digital signal and is determined by the signal processing apparatus.

13. The apparatus according to claim 12, wherein:

the processor further executes the instructions to cause the signal processing apparatus to:

input the analog signal into a corresponding adjustment channel according to the preconfigured transmit frequency band, and adjust the analog signal to the preconfigured transmit frequency band in a manner of performing up-conversion for N times, wherein N is greater than or equal to 0.

14. The apparatus according to claim 13, wherein:

the processor further executes the instructions to cause the signal processing apparatus to:

when N is equal to 0, which indicates that the analog signal has already been located in the preconfigured transmit frequency band, perform only direct amplification on the analog signal; or when N is greater than or equal to 1, perform filtering on the analog signal obtained after up-conversion is performed each time, amplify the analog signal obtained after last-time filtering, and adjust the analog signal to the preconfigured transmit frequency band.

15. A signal processing method, comprising:

receiving an analog signal;

adjusting the analog signal to a lowest frequency band when a frequency band of the analog signal falls outside the lowest frequency band in multiple preconfigured frequency bands; and processing, by using a signal processing channel in the lowest frequency band, the analog signal that has been adjusted to the lowest frequency band, wherein the processing, by using a signal processing channel in the lowest frequency band, the analog signal that has been adjusted to the lowest frequency band comprises:

splitting, according to a preconfigured policy, the analog signal that has been adjusted to the lowest frequency band, so that the analog signal that has been adjusted to the lowest frequency band forms at least two analog sub-signals;

performing down-conversion processing on the at least two analog sub-signals; performing analog-to-digital conversion on the at least two analog sub-signals obtained after the down-conversion, so as to form at least two digital sub-signals corresponding to the at least two analog sub-signals; and aggregating the at least two digital sub-signals into one digital signal.

16. The method according to claim 15, wherein when the analog signal that has been adjusted to the lowest frequency band is split according to the preconfigured policy, the method further comprises:

recording an association between the analog signal that has been adjusted to the lowest frequency band and the at least two analog sub-signals; and the aggregating the at least two digital sub-signals into one digital signal comprises:

aggregating the at least two digital sub-signals into the one digital signal according to the association between the analog signal that has been adjusted to the lowest frequency band and the at least two analog sub-signals.

17. The method according to claim 15, wherein the splitting, according to a preconfigured policy, the analog signal that has been adjusted to the lowest frequency band comprises:

determining, according to a sampling rate of an analog-to-digital converter, a quantity of sub-signals into which the analog signal is to be split; and splitting the analog signal into analog sub-signals of the quantity of sub-signals by using a power splitting/combining network.

18. The method according to claim 17, wherein before the performing down-conversion processing on the at least two analog sub-signals, the method further comprises:

decreasing bandwidths of the at least two analog sub-signals, so that bandwidths, obtained after the decrement, of the at least two analog sub-signals are less than or equal to the sampling rate that is of the analog-to-digital converter and is corresponding to the analog sub-signals, and a sum of the bandwidths, obtained after the decrement, of the at least two analog sub-signals remains unchanged.

19. The method according to claim 18, wherein the performing down-conversion processing on the at least two analog sub-signals comprises:

generating a corresponding local-frequency signal according to frequency bands in which the at least two analog sub-signals are located after the bandwidths of the at least two analog sub-signals are decreased; and performing, by using the corresponding local-frequency signal, down-conversion processing on the at least two analog sub-signals whose bandwidths have been decreased, to obtain the at least two analog sub-signals obtained after the down-conversion.

20. The method according to claim 15, wherein the adjusting the analog signal to a lowest frequency band when a frequency band of the analog signal falls outside the lowest frequency band in multiple preconfigured frequency bands comprises:

inputting the analog signal into a corresponding adjustment channel according to the frequency band of the analog signal; and adjusting the analog signal to the lowest frequency band in a manner of performing down-conversion for N times, wherein N is greater than or equal to 0.

21. The method according to claim 20, wherein:

when N is equal to 0, the adjusting the analog signal to the lowest frequency band comprises:

when N is equal to 0, which indicates that the analog signal has already been located in the lowest frequency band, performing only filtering and low-noise amplification on the analog signal; or when N is greater than or equal to 1, the adjusting the analog signal to the lowest frequency band comprises:

when N is equal to 1, successively performing filtering, low-noise amplification, and down-conversion on the analog signal, and adjusting the analog signal to the lowest frequency band; or when N is greater than 1, performing filtering on the analog signal obtained after the former down-conversion, then performing the latter down-conversion, and adjusting the analog signal to the lowest frequency band.

22. A signal processing method, comprising:

processing a to-be-transmitted digital signal by using a signal processing channel in a lowest frequency band in multiple preconfigured frequency bands, to form an analog signal;

adjusting, when a frequency band of the analog signal falls outside a preconfigured transmit frequency band of the digital signal, the analog signal to the preconfigured transmit frequency band; and transmitting the adjusted analog signal in the preconfigured transmit frequency band, wherein the processing a to-be-transmitted digital signal by using a signal processing channel in a lowest frequency band in multiple preconfigured frequency bands, to form an analog signal comprises:

splitting the to-be-transmitted digital signal according to a preconfigured policy, so that the digital signal forms at least two digital sub-signals;

performing digital-to-analog conversion on the at least two digital sub-signals, to correspondingly form at least two analog sub-signals;

performing up-conversion processing on the at least two analog sub-signals; and aggregating, into the analog signal, the at least two analog sub-signals obtained after the up-conversion.

23. The method according to claim 22, wherein when the to-be-transmitted digital signal is split according to the preconfigured policy, the method further comprises:

recording an association between the digital signal and the at least two digital sub-signals obtained after the digital signal is split; and the aggregating, into the analog signal, the at least two analog sub-signals obtained after the up-conversion comprises:

aggregating the at least two analog sub-signals obtained after the up-conversion into the analog signal by using a power splitting/combining network according to the association between the digital signal and the at least two digital sub-signals.

24. The method according to claim 22, wherein the splitting the to-be-transmitted digital signal according to a preconfigured policy comprises:

determining, according to a sampling rate of an analog-to-digital converter, a quantity of sub-signals into which the digital signal is to be split; and splitting the digital signal into digital sub-signals of the quantity of sub-signals.

25. The method according to claim 24, wherein the performing up-conversion processing on the at least two analog sub-signals comprises:

determining, according to the preconfigured transmit frequency band, to-be-up-converted sub-bands corresponding to the at least two analog sub-signals;

generating corresponding local-frequency signals according to the to-be-up-converted sub-bands corresponding to the at least two analog sub-signals; and performing up-conversion processing on the at least two analog sub-signals by using the corresponding local-frequency signals, so that the at least two analog sub-signals are up-converted to the corresponding up-conversion sub-bands, to obtain the at least two analog sub-signals obtained after the up-conversion.

26. The method according to claim 25, wherein after the performing up-conversion processing on the at least two analog sub-signals, the method further comprises:

determining, according to the to-be-up-converted sub-bands corresponding to the at least two analog sub-signals, a to-be-up-converted frequency band corresponding to the digital signal; and increasing bandwidths of the at least two analog sub-signals obtained after the up-conversion processing, so that frequency bands of the at least two analog sub-signals whose bandwidths are increased are restored to the to-be-up-converted frequency band corresponding to the digital signal.

27. The method according to claim 26, wherein the adjusting, when a frequency band of the analog signal falls outside a preconfigured transmit frequency band of the digital signal, the analog signal to the preconfigured transmit frequency band comprises:

inputting the analog signal into a corresponding adjustment channel according to the preconfigured transmit frequency band; and adjusting the analog signal to the preconfigured transmit frequency band in a manner of performing up-conversion for N times, wherein N is greater than or equal to 0.

28. The method according to claim 27, wherein:

when N is equal to 0, the adjusting the analog signal to the preconfigured transmit frequency band comprises:

when N is equal to 0, which indicates that the analog signal has already been located in the preconfigured transmit frequency band, performing only direct amplification on the analog signal; or when N is greater than or equal to 1, performing filtering on the analog signal obtained after up-conversion is performed each time, amplifying the analog signal obtained after last-time filtering, and adjusting the analog signal to the preconfigured transmit frequency band.

* * * * *